United States Patent
Brady et al.

(10) Patent No.: US 10,223,744 B2
(45) Date of Patent: Mar. 5, 2019

(54) LOCATION AND EVENT CAPTURE CIRCUITRY TO FACILITATE REMOTE VEHICLE LOCATION PREDICTIVE MODELING WHEN GLOBAL POSITIONING IS UNAVAILABLE

(71) Applicant: Spireon, Inc., Irvine, CA (US)

(72) Inventors: James Brady, Cardiff by the Sea, CA (US); Brian Wheeler, Cherry Hills, CO (US); David Estes, Westfield, IN (US); Thomas Marks, Long Beach, CA (US); Andy Warner, Westminster, CO (US); Ben Tran, Yorba Linda, CA (US); Michael Callinan, Anaheim, CA (US); Chris Collingwood, Irvine, CA (US); David Withers, Tustin, CA (US); Ilie Ardelean, Fullerton, CA (US)

(73) Assignee: Spireon, Inc., Irvine, CA (US)

( * ) Notice: Subject to any disclaimer, the term of this patent is extended or adjusted under 35 U.S.C. 154(b) by 19 days.

(21) Appl. No.: 15/095,184

(22) Filed: Apr. 11, 2016

(65) Prior Publication Data
US 2016/0225072 A1 Aug. 4, 2016

Related U.S. Application Data

(63) Continuation of application No. 14/145,914, filed on Dec. 31, 2013, now abandoned.
(Continued)

(51) Int. Cl.
*G06Q 40/02* (2012.01)
*B60R 16/023* (2006.01)
(Continued)

(52) U.S. Cl.
CPC .......... *G06Q 40/02* (2013.01); *B60R 16/0231* (2013.01); *G01S 5/0027* (2013.01); *G07C 5/008* (2013.01); *G07C 5/0841* (2013.01)

(58) Field of Classification Search
CPC ...... G06Q 40/02; G06Q 40/06; G01S 5/0027; G07C 5/0841; G07C 5/008; B60R 16/0231
(Continued)

(56) References Cited

U.S. PATENT DOCUMENTS 4,067,061 A  1/1978 Juhasz
4,633,407 A  12/1986 Freienstein et al.
(Continued)

FOREIGN PATENT DOCUMENTS

CA  2609106 A1  10/2008
CA  2688263 A1  12/2008
(Continued)

OTHER PUBLICATIONS

"Dynamic Vehicle Detection Via the Use of Magnetic Field Sensors", MDPI, Jan. 19, 2016 by Vytautas Markevicius et al. (pp. 9) http://www.mdpi.com/1424-8220/16/1/78/pdf.
(Continued)

*Primary Examiner* — Nga X Nguyen
(74) *Attorney, Agent, or Firm* — Luedeka Neely Group, P.C.

(57) ABSTRACT

Disclosed are a device and/or a method of location and event capture circuitry to facilitate remote vehicle location predictive modeling when global positioning is unavailable. In one embodiment, a predictive circuit of a vehicle includes event detection circuitry to initiate a timer circuit of the vehicle when a wheel of the vehicle is in a stationary state beyond threshold amount of time during an event; an event categorization circuitry to monitor a telemetry data of the
(Continued)

vehicle to assign a category to the event; a data communication circuitry to communicate the event, the category, and/or a set of other events and categories to a predictive recommendation server on a periodic basis; and a repossession detection circuitry to determine that the vehicle is pending repossession based on the event, the category, the set of other events and categories, and/or a message communicated from the predictive recommendation server to the predictive circuit.

9 Claims, 10 Drawing Sheets

Related U.S. Application Data

(60) Provisional application No. 62/145,508, filed on Apr. 9, 2015.

(51) Int. Cl.
  *G01S 5/00*  (2006.01)
  *G07C 5/00*  (2006.01)
  *G07C 5/08*  (2006.01)

(58) Field of Classification Search
  USPC .............................. 705/36 R, 35, 40; 701/36
  See application file for complete search history.

(56) References Cited

U.S. PATENT DOCUMENTS

| | | | |
|---|---|---|---|
| 4,654,821 A | 3/1987 | Lapp | |
| 4,663,725 A | 5/1987 | Truckenbrod et al. | |
| 4,675,539 A | 6/1987 | Nichol | |
| 4,695,946 A | 9/1987 | Andreasen et al. | |
| 4,701,845 A | 10/1987 | Andreasen et al. | |
| 4,727,360 A | 2/1988 | Ferguson et al. | |
| 4,837,700 A | 6/1989 | Ando et al. | |
| 4,884,242 A | 11/1989 | Lacy et al. | |
| 4,891,650 A | 1/1990 | Sheffer | |
| 4,907,150 A | 3/1990 | Arroyo et al. | |
| 5,119,301 A | 6/1992 | Shimizu et al. | |
| 5,122,959 A | 6/1992 | Nathanson et al. | |
| 5,208,756 A | 5/1993 | Song | |
| 5,218,367 A | 6/1993 | Sheffer et al. | |
| 5,223,844 A | 6/1993 | Mansell et al. | |
| 5,276,865 A | 1/1994 | Thorpe | |
| 5,289,369 A | 2/1994 | Hirshberg | |
| 5,299,132 A | 3/1994 | Wortham | |
| 5,307,277 A | 4/1994 | Hirano | |
| 5,390,125 A | 2/1995 | Sennott et al. | |
| 5,408,411 A | 4/1995 | Nakamura et al. | |
| 5,424,952 A | 6/1995 | Asayama | |
| 5,457,439 A | 10/1995 | Kuhn | |
| 5,515,419 A | 5/1996 | Sheffer | |
| 5,521,579 A | 5/1996 | Bernhard | |
| 5,610,815 A | 3/1997 | Gudat et al. | |
| 5,684,474 A | 11/1997 | Gilon et al. | |
| 5,686,888 A | 11/1997 | Welles, II et al. | |
| 5,708,820 A | 1/1998 | Park et al. | |
| 5,712,789 A | 1/1998 | Radican | |
| 5,751,245 A | 5/1998 | Janky et al. | |
| 5,805,103 A | 9/1998 | Doi et al. | |
| 5,867,804 A | 2/1999 | Pilley et al. | |
| 5,870,029 A | 2/1999 | Otto et al. | |
| 5,877,956 A | 3/1999 | Frank et al. | |
| 5,917,433 A | 6/1999 | Keillor et al. | |
| 5,923,243 A | 7/1999 | Bleiner | |
| 5,949,974 A | 9/1999 | Ewing et al. | |
| 5,978,236 A | 11/1999 | Faberman et al. | |
| 6,029,111 A | 2/2000 | Croyle | |
| 6,067,044 A | 5/2000 | Whelan et al. | |
| 6,075,441 A | 6/2000 | Maloney | |
| 6,091,323 A | 7/2000 | Kawai | |
| 6,148,291 A | 11/2000 | Radican | |
| 6,154,152 A | 11/2000 | Ito | |
| 6,181,029 B1 | 1/2001 | Berglund et al. | |
| 6,202,023 B1 | 3/2001 | Hancock et al. | |
| 6,204,764 B1 | 3/2001 | Maloney | |
| 6,226,389 B1 | 5/2001 | Lemelson et al. | |
| 6,233,563 B1 | 5/2001 | Jefferson et al. | |
| 6,240,365 B1 | 5/2001 | Bunn | |
| 6,249,217 B1 | 6/2001 | Forbes | |
| 6,266,008 B1 | 7/2001 | Huston et al. | |
| 6,275,773 B1 | 8/2001 | Lemelson et al. | |
| 6,317,693 B2 | 11/2001 | Kodaka et al. | |
| 6,338,011 B1 | 1/2002 | Furst et al. | |
| 6,339,369 B1 | 1/2002 | Paranjpe | |
| 6,339,745 B1 | 1/2002 | Novik | |
| 6,363,320 B1 | 3/2002 | Chou | |
| 6,385,539 B1 | 5/2002 | Wilson et al. | |
| 6,388,580 B1 | 5/2002 | Graham | |
| 6,393,582 B1 | 5/2002 | Klecka et al. | |
| 6,393,584 B1 | 5/2002 | McLaren et al. | |
| 6,415,227 B1 | 7/2002 | Lin | |
| 6,483,434 B1 | 11/2002 | Umiker | |
| 6,502,080 B1 | 12/2002 | Eichorst et al. | |
| 6,510,381 B2 | 1/2003 | Grounds et al. | |
| 6,512,465 B2 | 1/2003 | Flick | |
| 6,577,921 B1 | 6/2003 | Carson | |
| 6,584,403 B2 | 6/2003 | Bunn | |
| 6,701,234 B1 | 3/2004 | Vogelsang | |
| 6,704,810 B1 | 3/2004 | Krehbiel, Jr. et al. | |
| 6,714,857 B2 | 3/2004 | Kapolka et al. | |
| 6,717,527 B2 | 4/2004 | Simon | |
| 6,720,920 B2 | 4/2004 | Breed et al. | |
| 6,737,963 B2 | 5/2004 | Gutta et al. | |
| 6,748,320 B2 | 6/2004 | Jones | |
| 6,771,970 B1 | 8/2004 | Dan | |
| 6,816,090 B2 | 11/2004 | Teckchandani et al. | |
| 6,832,153 B2 | 12/2004 | Thayer et al. | |
| 6,844,827 B2 | 1/2005 | Flick | |
| 6,856,902 B1 | 2/2005 | Mitchem | |
| 6,871,137 B2 | 3/2005 | Scaer et al. | |
| 6,873,963 B1 | 3/2005 | Westbury et al. | |
| 6,904,359 B2 | 6/2005 | Jones | |
| 6,930,638 B2 | 8/2005 | Lloyd et al. | |
| 6,931,309 B2 | 8/2005 | Phelan et al. | |
| 6,985,087 B2 | 1/2006 | Soliman | |
| 7,035,856 B1 | 4/2006 | Morimoto | |
| 7,039,520 B2 | 5/2006 | Draeger et al. | |
| 7,065,445 B2 | 6/2006 | Thayer et al. | |
| 7,072,764 B2 | 7/2006 | Donath et al. | |
| 7,091,835 B2 | 8/2006 | Boulay et al. | |
| 7,096,392 B2 | 8/2006 | Sim-Tang | |
| 7,099,934 B1 | 8/2006 | Ewing et al. | |
| 7,154,390 B2 | 12/2006 | Giermanski et al. | |
| 7,170,390 B2 | 1/2007 | Quinones et al. | |
| 7,174,243 B1 | 2/2007 | Lightner et al. | |
| 7,177,738 B2 | 2/2007 | Diaz | |
| 7,212,134 B2 | 5/2007 | Taylor | |
| 7,215,255 B2 | 5/2007 | Grush | |
| 7,242,303 B2 | 7/2007 | Patel et al. | |
| 7,253,731 B2 | 8/2007 | Joao | |
| 7,266,378 B2 | 9/2007 | Norta et al. | |
| 7,283,046 B2 | 10/2007 | Culpepper et al. | |
| 7,289,019 B1 | 10/2007 | Kertes | |
| 7,302,344 B2 | 11/2007 | Olney et al. | |
| 7,308,611 B2 | 12/2007 | Booth | |
| 7,327,238 B2 | 2/2008 | Bhogal et al. | |
| 7,339,469 B2 | 3/2008 | Braun | |
| 7,343,306 B1 | 3/2008 | Bates et al. | |
| 7,346,439 B2 | 3/2008 | Bodin | |
| 7,346,790 B1 | 3/2008 | Klein | |
| 7,405,658 B2 | 7/2008 | Richards | |
| 7,446,649 B2 | 11/2008 | Bhogal et al. | |
| 7,455,225 B1 | 11/2008 | Hadfield et al. | |
| 7,467,325 B2 | 12/2008 | Eisen et al. | |
| 7,472,202 B2 | 12/2008 | Parupudi et al. | |
| 7,479,877 B2 | 1/2009 | Mortenson et al. | |
| 7,486,176 B2 | 2/2009 | Bhogal et al. | |
| 7,489,993 B2 | 2/2009 | Coffee et al. | |
| 7,527,288 B2 | 5/2009 | Breed | |

(56) References Cited

U.S. PATENT DOCUMENTS

| | | |
|---|---|---|
| 7,552,008 B2 | 6/2009 | Newstrom et al. |
| 7,555,370 B2 | 6/2009 | Breed et al. |
| 7,571,051 B1 | 8/2009 | Shulman |
| 7,574,195 B2 | 8/2009 | Krasner et al. |
| 7,580,782 B2 | 8/2009 | Breed et al. |
| 7,593,999 B2 | 9/2009 | Nathanson |
| 7,600,150 B2 | 10/2009 | Wu |
| 7,617,037 B2 | 11/2009 | Desens et al. |
| 7,650,210 B2 | 1/2010 | Breed |
| 7,652,568 B2 | 1/2010 | Waugh et al. |
| 7,657,354 B2 | 2/2010 | Breed et al. |
| 7,668,931 B2 | 2/2010 | Parupudi et al. |
| 7,672,756 B2 | 3/2010 | Breed |
| 7,693,626 B2 | 4/2010 | Breed et al. |
| 7,701,363 B1 | 4/2010 | Zlojutro |
| 7,725,216 B2 | 5/2010 | Kim |
| 7,746,228 B2 | 6/2010 | Sensenig et al. |
| 7,751,944 B2 | 7/2010 | Parupudi et al. |
| 7,755,541 B2 | 7/2010 | Wisherd et al. |
| 7,769,499 B2 | 8/2010 | McQuade et al. |
| 7,774,633 B1 | 8/2010 | Harrenstien et al. |
| 7,817,033 B2 | 10/2010 | Motoyama |
| 7,876,239 B2 | 1/2011 | Horstemeyer |
| 7,893,818 B2 | 2/2011 | Smoyer et al. |
| 7,899,591 B2 | 3/2011 | Shah et al. |
| 7,899,621 B2 | 3/2011 | Breed et al. |
| 7,916,026 B2 | 3/2011 | Johnson et al. |
| 7,950,570 B2 | 5/2011 | Marchasin et al. |
| 7,971,095 B2 | 6/2011 | Hess et al. |
| 7,987,017 B2 | 7/2011 | Buzzoni et al. |
| 8,009,034 B2 | 8/2011 | Dobson et al. |
| 8,009,086 B2 | 8/2011 | Grossnick et al. |
| 8,095,304 B2 | 1/2012 | Blanton et al. |
| 8,103,450 B2 | 1/2012 | Takaoka |
| 8,103,741 B2 | 1/2012 | Frazier et al. |
| 8,106,757 B2 | 1/2012 | Brinton et al. |
| 8,111,154 B1 | 2/2012 | Puri et al. |
| 8,126,601 B2 | 2/2012 | Kapp et al. |
| 8,181,868 B2 | 5/2012 | Thomas et al. |
| 8,185,767 B2 | 5/2012 | Ballou et al. |
| 8,201,009 B2 | 6/2012 | Sun et al. |
| 8,237,591 B2 | 8/2012 | Holcomb et al. |
| 8,255,144 B2 | 8/2012 | Breed et al. |
| 8,279,067 B2 | 10/2012 | Berger et al. |
| 8,299,920 B2 | 10/2012 | Hamm et al. |
| 8,306,687 B2 | 11/2012 | Chen |
| 8,311,858 B2 | 11/2012 | Everett et al. |
| 8,326,813 B2 | 12/2012 | Nizami et al. |
| 8,330,626 B1 | 12/2012 | Adelson |
| 8,330,817 B1 | 12/2012 | Foster |
| 8,368,561 B2 | 2/2013 | Welch et al. |
| 8,380,426 B2 | 2/2013 | Konijnendijk |
| 8,398,405 B2 | 3/2013 | Kumar |
| 8,407,139 B1 | 3/2013 | Palmer |
| 8,452,771 B2 | 5/2013 | Kurciska et al. |
| 8,462,021 B2 | 6/2013 | Welch et al. |
| 8,467,324 B2 | 6/2013 | Yousefi et al. |
| 8,489,907 B2 | 7/2013 | Wakrat et al. |
| 8,502,661 B2 | 8/2013 | Mauro et al. |
| 8,504,233 B1 | 8/2013 | Ferguson et al. |
| 8,504,512 B2 | 8/2013 | Herzog et al. |
| 8,510,200 B2 | 8/2013 | Pearlman et al. |
| 8,527,135 B2 | 9/2013 | Lowrey et al. |
| 8,565,963 B2 | 10/2013 | Burke, Jr. |
| 8,587,430 B2 | 11/2013 | Ferguson et al. |
| 8,612,137 B2 | 12/2013 | Harris et al. |
| 8,626,152 B2 | 1/2014 | Farrell et al. |
| 8,655,544 B2 | 2/2014 | Fletcher et al. |
| 8,655,983 B1 | 2/2014 | Harris et al. |
| 8,671,063 B2 | 3/2014 | Ehrman et al. |
| 8,700,249 B1 | 4/2014 | Carrithers |
| 8,718,536 B2 | 5/2014 | Hannon |
| 8,725,326 B2 | 5/2014 | Kapp et al. |
| 8,725,342 B2 | 5/2014 | Ferguson et al. |
| 8,762,009 B2 | 6/2014 | Ehrman et al. |
| 8,766,797 B2 | 7/2014 | Hamm et al. |
| 8,770,480 B2 | 7/2014 | Gulli |
| 8,781,169 B2 | 7/2014 | Jackson et al. |
| 8,781,958 B2 | 7/2014 | Michael |
| 8,799,461 B2 | 8/2014 | Herz et al. |
| 8,839,026 B2 | 9/2014 | Kopylovitz |
| 8,898,002 B2 * | 11/2014 | Barrett .................. G01C 21/26 340/995.12 |
| 8,933,802 B2 | 1/2015 | Baade |
| 8,970,701 B2 | 3/2015 | Lao |
| 9,049,564 B2 | 6/2015 | Muetzel et al. |
| 9,076,276 B1 * | 7/2015 | Kator .................. G06Q 10/087 |
| 2001/0006398 A1 | 7/2001 | Nakamura et al. |
| 2001/0018628 A1 | 8/2001 | Jenkins et al. |
| 2001/0018639 A1 | 8/2001 | Bunn |
| 2001/0034577 A1 | 10/2001 | Grounds et al. |
| 2001/0037298 A1 | 11/2001 | Ehrman et al. |
| 2002/0000916 A1 | 1/2002 | Richards |
| 2002/0014978 A1 | 2/2002 | Flick |
| 2002/0059126 A1 | 5/2002 | Ricciardi |
| 2002/0070891 A1 | 6/2002 | Huston et al. |
| 2002/0082025 A1 | 6/2002 | Baese et al. |
| 2002/0184062 A1 | 12/2002 | Diaz |
| 2002/0186144 A1 | 12/2002 | Meunier |
| 2002/0198632 A1 | 12/2002 | Breed et al. |
| 2003/0009361 A1 | 1/2003 | Hancock et al. |
| 2003/0013146 A1 | 1/2003 | Werb |
| 2003/0018428 A1 | 1/2003 | Knockeart et al. |
| 2003/0023614 A1 | 1/2003 | Newstrom et al. |
| 2003/0055542 A1 | 3/2003 | Knockeart et al. |
| 2003/0055553 A1 | 3/2003 | Knockeart et al. |
| 2003/0083060 A1 | 5/2003 | Menendez |
| 2003/0125855 A1 | 7/2003 | Breed et al. |
| 2003/0151501 A1 | 8/2003 | Teckchandani et al. |
| 2003/0151507 A1 | 8/2003 | Andre et al. |
| 2003/0158638 A1 | 8/2003 | Yakes et al. |
| 2003/0158639 A1 | 8/2003 | Nada |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0174067 A1 | 9/2003 | Soliman |
| 2003/0176959 A1 | 9/2003 | Breed |
| 2003/0191567 A1 | 10/2003 | Gentilcore |
| 2003/0191568 A1 | 10/2003 | Breed |
| 2003/0204407 A1 | 10/2003 | Nabors et al. |
| 2004/0006398 A1 | 1/2004 | Bickford |
| 2004/0006413 A1 | 1/2004 | Kane et al. |
| 2004/0049337 A1 | 3/2004 | Knockeart et al. |
| 2004/0056797 A1 | 3/2004 | Knockeart et al. |
| 2004/0093291 A1 | 5/2004 | Bodin |
| 2004/0102895 A1 | 5/2004 | Thayer et al. |
| 2004/0102896 A1 | 5/2004 | Thayer et al. |
| 2004/0130440 A1 | 7/2004 | Boulay et al. |
| 2004/0143378 A1 | 7/2004 | Vogelsang |
| 2004/0162063 A1 | 8/2004 | Quinones et al. |
| 2004/0199285 A1 | 10/2004 | Berichon et al. |
| 2004/0199302 A1 | 10/2004 | Pillar et al. |
| 2004/0204969 A1 | 10/2004 | Wu |
| 2004/0225557 A1 | 11/2004 | Phelan et al. |
| 2004/0246177 A1 | 12/2004 | Lloyd et al. |
| 2005/0004748 A1 | 1/2005 | Pinto et al. |
| 2005/0007450 A1 | 1/2005 | Hill et al. |
| 2005/0021199 A1 | 1/2005 | Zimmerman et al. |
| 2005/0021722 A1 | 1/2005 | Metzger |
| 2005/0043879 A1 | 2/2005 | Desens et al. |
| 2005/0060069 A1 | 3/2005 | Breed et al. |
| 2005/0080565 A1 | 4/2005 | Olney et al. |
| 2005/0114023 A1 | 5/2005 | Williamson et al. |
| 2005/0131597 A1 | 6/2005 | Raz et al. |
| 2005/0134504 A1 | 6/2005 | Harwood et al. |
| 2005/0149251 A1 | 7/2005 | Donath et al. |
| 2005/0171798 A1 | 8/2005 | Croft et al. |
| 2005/0216294 A1 | 9/2005 | Labow |
| 2005/0237166 A1 | 10/2005 | Chen |
| 2006/0041341 A1 | 2/2006 | Kane et al. |
| 2006/0041342 A1 | 2/2006 | Kane et al. |
| 2006/0052913 A1 | 3/2006 | Kane et al. |
| 2006/0053075 A1 | 3/2006 | Roth et al. |

(56) References Cited

U.S. PATENT DOCUMENTS

| | | |
|---|---|---|
| 2006/0055561 A1 | 3/2006 | Kamali et al. |
| 2006/0074558 A1 | 4/2006 | Williamson et al. |
| 2006/0087411 A1 | 4/2006 | Chang |
| 2006/0089786 A1 | 4/2006 | Soehren |
| 2006/0109106 A1 | 5/2006 | Braun |
| 2006/0129290 A1 | 6/2006 | Zimmerman et al. |
| 2006/0155427 A1 | 7/2006 | Yang |
| 2006/0155434 A1 | 7/2006 | Kane et al. |
| 2006/0187026 A1 | 8/2006 | Kochis |
| 2006/0253234 A1 | 11/2006 | Kane et al. |
| 2006/0273922 A1 | 12/2006 | Bhogal et al. |
| 2007/0005202 A1 | 1/2007 | Breed |
| 2007/0027726 A1 | 2/2007 | Warren et al. |
| 2007/0057781 A1 | 3/2007 | Breed |
| 2007/0061054 A1 | 3/2007 | Rowe et al. |
| 2007/0061076 A1 | 3/2007 | Shulman |
| 2007/0086624 A1 | 4/2007 | Breed et al. |
| 2007/0087756 A1 | 4/2007 | Hoffberg |
| 2007/0096565 A1 | 5/2007 | Breed et al. |
| 2007/0096899 A1 | 5/2007 | Johnson |
| 2007/0115101 A1 | 5/2007 | Creekbaum et al. |
| 2007/0135984 A1 | 6/2007 | Breed et al. |
| 2007/0139216 A1 | 6/2007 | Breed |
| 2007/0156317 A1 | 7/2007 | Breed |
| 2007/0159354 A1 | 7/2007 | Rosenberg |
| 2007/0162550 A1 | 7/2007 | Rosenberg |
| 2007/0167147 A1 | 7/2007 | Krasner et al. |
| 2007/0185625 A1 | 8/2007 | Pillar et al. |
| 2007/0185728 A1* | 8/2007 | Schwarz ............... G06Q 10/06 701/36 |
| 2007/0200690 A1 | 8/2007 | Bhogal et al. |
| 2007/0239322 A1 | 10/2007 | McQuade et al. |
| 2007/0244614 A1 | 10/2007 | Nathanson |
| 2007/0285240 A1 | 12/2007 | Sensenig et al. |
| 2007/0290836 A1 | 12/2007 | Ainsworth et al. |
| 2007/0290923 A1 | 12/2007 | Norta et al. |
| 2008/0015748 A1 | 1/2008 | Nagy |
| 2008/0036187 A1 | 2/2008 | Breed |
| 2008/0040004 A1 | 2/2008 | Breed |
| 2008/0040005 A1 | 2/2008 | Breed |
| 2008/0040023 A1 | 2/2008 | Breed et al. |
| 2008/0040268 A1 | 2/2008 | Corn |
| 2008/0042875 A1 | 2/2008 | Harrington et al. |
| 2008/0046150 A1 | 2/2008 | Breed |
| 2008/0051957 A1 | 2/2008 | Breed et al. |
| 2008/0051995 A1 | 2/2008 | Lokshin et al. |
| 2008/0061953 A1 | 3/2008 | Bhogal et al. |
| 2008/0065291 A1 | 3/2008 | Breed |
| 2008/0077285 A1 | 3/2008 | Kumar et al. |
| 2008/0077326 A1 | 3/2008 | Funk et al. |
| 2008/0091350 A1 | 4/2008 | Smith et al. |
| 2008/0111546 A1 | 5/2008 | Takahashi et al. |
| 2008/0119993 A1 | 5/2008 | Breed |
| 2008/0147265 A1 | 6/2008 | Breed |
| 2008/0147280 A1 | 6/2008 | Breed |
| 2008/0157510 A1 | 7/2008 | Breed et al. |
| 2008/0162045 A1 | 7/2008 | Lee |
| 2008/0167821 A1 | 7/2008 | Breed |
| 2008/0176537 A1 | 7/2008 | Smoyer et al. |
| 2008/0183344 A1 | 7/2008 | Doyen et al. |
| 2008/0183376 A1 | 7/2008 | Knockeart et al. |
| 2008/0195261 A1 | 8/2008 | Breed |
| 2008/0195432 A1 | 8/2008 | Fell et al. |
| 2008/0215190 A1 | 9/2008 | Pillar et al. |
| 2008/0234933 A1 | 9/2008 | Chowdhary et al. |
| 2008/0235105 A1 | 9/2008 | Payne et al. |
| 2008/0252431 A1 | 10/2008 | Nigam |
| 2008/0262669 A1 | 10/2008 | Smid et al. |
| 2008/0278314 A1 | 11/2008 | Miller et al. |
| 2008/0294302 A1 | 11/2008 | Basir |
| 2008/0318547 A1 | 12/2008 | Ballou, Jr. et al. |
| 2009/0033494 A1 | 2/2009 | Malik |
| 2009/0079591 A1 | 3/2009 | Motoyama |
| 2009/0082918 A1 | 3/2009 | Hendrix, Jr. |
| 2009/0112394 A1 | 4/2009 | Lepejian et al. |
| 2009/0138497 A1 | 5/2009 | Zavoli et al. |
| 2009/0140887 A1 | 6/2009 | Breed et al. |
| 2009/0177378 A1 | 7/2009 | Kamalski et al. |
| 2009/0261975 A1 | 10/2009 | Ferguson et al. |
| 2009/0273489 A1 | 11/2009 | Lu |
| 2009/0326808 A1 | 12/2009 | Blanton et al. |
| 2010/0036793 A1 | 2/2010 | Willis et al. |
| 2010/0049669 A1 | 2/2010 | Mazzarolo |
| 2010/0057279 A1 | 3/2010 | Kyllingstad |
| 2010/0057305 A1 | 3/2010 | Breed |
| 2010/0071572 A1 | 3/2010 | Carroll et al. |
| 2010/0076878 A1 | 3/2010 | Burr et al. |
| 2010/0082195 A1 | 4/2010 | Lee et al. |
| 2010/0094482 A1 | 4/2010 | Schofield et al. |
| 2010/0094500 A1 | 4/2010 | Jin |
| 2010/0117868 A1 | 5/2010 | Van Wiemeersch et al. |
| 2010/0127867 A1 | 5/2010 | Chien et al. |
| 2010/0152972 A1 | 6/2010 | Attard et al. |
| 2010/0169009 A1 | 7/2010 | Breed et al. |
| 2010/0174487 A1 | 7/2010 | Soehren |
| 2010/0191412 A1 | 7/2010 | Kim |
| 2010/0207754 A1 | 8/2010 | Shostak et al. |
| 2010/0250411 A1 | 9/2010 | Ogrodski |
| 2010/0265104 A1 | 10/2010 | Zlojutro |
| 2010/0274415 A1 | 10/2010 | Lam |
| 2010/0332080 A1 | 12/2010 | Bae |
| 2010/0332118 A1 | 12/2010 | Geelen et al. |
| 2010/0332363 A1 | 12/2010 | Duddle et al. |
| 2011/0016340 A1 | 1/2011 | Sun et al. |
| 2011/0060496 A1 | 3/2011 | Nielsen et al. |
| 2011/0071750 A1 | 3/2011 | Giovino et al. |
| 2011/0078089 A1 | 3/2011 | Hamm et al. |
| 2011/0090075 A1 | 4/2011 | Armitage et al. |
| 2011/0090399 A1 | 4/2011 | Whitaker et al. |
| 2011/0106337 A1 | 5/2011 | Patel et al. |
| 2011/0137489 A1 | 6/2011 | Gilleland et al. |
| 2011/0140877 A1 | 6/2011 | Gilchrist et al. |
| 2011/0143669 A1 | 6/2011 | Farrell et al. |
| 2011/0166773 A1 | 7/2011 | Raz et al. |
| 2011/0181391 A1 | 7/2011 | Chu |
| 2011/0196580 A1 | 8/2011 | Xu et al. |
| 2011/0221573 A1 | 9/2011 | Huat |
| 2011/0257880 A1 | 10/2011 | Watanabe et al. |
| 2011/0270772 A1 | 11/2011 | Hall et al. |
| 2011/0275388 A1 | 11/2011 | Haney |
| 2012/0029818 A1 | 2/2012 | Smith et al. |
| 2012/0041618 A1 | 2/2012 | Sun et al. |
| 2012/0075088 A1 | 3/2012 | Marentes Aguilar |
| 2012/0077475 A1 | 3/2012 | Holcomb et al. |
| 2012/0078497 A1 | 3/2012 | Burke, Jr. |
| 2012/0089328 A1 | 4/2012 | Ellanti et al. |
| 2012/0089686 A1 | 4/2012 | Meister |
| 2012/0106446 A1 | 5/2012 | Yousefi et al. |
| 2012/0106801 A1 | 5/2012 | Jackson |
| 2012/0123806 A1 | 5/2012 | Schumann, Jr. et al. |
| 2012/0166018 A1 | 6/2012 | Larschan et al. |
| 2012/0191329 A1 | 7/2012 | Roessle et al. |
| 2012/0197484 A1 | 8/2012 | Nath et al. |
| 2012/0218129 A1 | 8/2012 | Burns |
| 2012/0232945 A1 | 9/2012 | Tong |
| 2012/0249326 A1 | 10/2012 | Mostov |
| 2012/0252488 A1 | 10/2012 | Hartmann et al. |
| 2012/0253861 A1 | 10/2012 | Davidson et al. |
| 2012/0268260 A1 | 10/2012 | Miller et al. |
| 2012/0289295 A1* | 11/2012 | Murray ............... B60R 25/04 455/573 |
| 2012/0303237 A1 | 11/2012 | Kumar et al. |
| 2012/0323767 A1 | 12/2012 | Michael |
| 2012/0323771 A1 | 12/2012 | Michael |
| 2012/0323772 A1 | 12/2012 | Michael |
| 2013/0024202 A1* | 1/2013 | Harris ............... G06Q 30/00 705/1.1 |
| 2013/0031318 A1 | 1/2013 | Chen et al. |
| 2013/0031345 A1 | 1/2013 | Kung |
| 2013/0035827 A1 | 2/2013 | Breed |
| 2013/0057397 A1 | 3/2013 | Cutler et al. |
| 2013/0059607 A1 | 3/2013 | Herz et al. |
| 2013/0061044 A1 | 3/2013 | Pinkus et al. |
| 2013/0066757 A1 | 3/2013 | Lovelace et al. |

(56) References Cited

U.S. PATENT DOCUMENTS

| | | |
|---|---|---|
| 2013/0069390 A1 | 3/2013 | Foster |
| 2013/0097458 A1 | 4/2013 | Sekino et al. |
| 2013/0100286 A1 | 4/2013 | Lao |
| 2013/0113637 A1 | 5/2013 | Sin et al. |
| 2013/0131928 A1 | 5/2013 | Bolton et al. |
| 2013/0138251 A1 | 5/2013 | Thogersen et al. |
| 2013/0144667 A1 | 6/2013 | Ehrman et al. |
| 2013/0144770 A1 | 6/2013 | Boling et al. |
| 2013/0144771 A1 | 6/2013 | Boling et al. |
| 2013/0144805 A1* | 6/2013 | Boling .................. G06Q 40/06 705/36 R |
| 2013/0159214 A1 | 6/2013 | Boling et al. |
| 2013/0166198 A1 | 6/2013 | Funk et al. |
| 2013/0179034 A1 | 7/2013 | Pryor |
| 2013/0185193 A1 | 7/2013 | Boling et al. |
| 2013/0185221 A1 | 7/2013 | Adams et al. |
| 2013/0218369 A1 | 8/2013 | Yoshihama et al. |
| 2013/0218461 A1 | 8/2013 | Naimark |
| 2013/0222133 A1 | 8/2013 | Schultz et al. |
| 2013/0249713 A1 | 9/2013 | Adelson |
| 2013/0250933 A1 | 9/2013 | Yousefi et al. |
| 2013/0253732 A1 | 9/2013 | Patel et al. |
| 2013/0253734 A1 | 9/2013 | Kaap et al. |
| 2013/0253754 A1 | 9/2013 | Ferguson et al. |
| 2013/0297199 A1 | 11/2013 | Kapp et al. |
| 2013/0302757 A1 | 11/2013 | Pearlman et al. |
| 2013/0311077 A1 | 11/2013 | Ichida |
| 2013/0332070 A1 | 12/2013 | Fleizach et al. |
| 2014/0012438 A1 | 1/2014 | Shoppa et al. |
| 2014/0012510 A1 | 1/2014 | Mensinger et al. |
| 2014/0012511 A1 | 1/2014 | Mensinger et al. |
| 2014/0012634 A1 | 1/2014 | Pearlman et al. |
| 2014/0025229 A1 | 1/2014 | Levien et al. |
| 2014/0025230 A1 | 1/2014 | Levien et al. |
| 2014/0025233 A1 | 1/2014 | Levien et al. |
| 2014/0025234 A1 | 1/2014 | Levien et al. |
| 2014/0025235 A1 | 1/2014 | Levien et al. |
| 2014/0025236 A1 | 1/2014 | Levien et al. |
| 2014/0025284 A1 | 1/2014 | Roberts |
| 2014/0036072 A1 | 2/2014 | Lyall et al. |
| 2014/0052366 A1 | 2/2014 | Rothschild |
| 2014/0052605 A1 | 2/2014 | Beerle et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0058805 A1 | 2/2014 | Paesler et al. |
| 2014/0067160 A1 | 3/2014 | Levien et al. |
| 2014/0067167 A1 | 3/2014 | Levien et al. |
| 2014/0074692 A1 | 3/2014 | Beerle et al. |
| 2014/0077285 A1 | 3/2014 | Noda et al. |
| 2014/0077326 A1 | 3/2014 | Koshino et al. |
| 2014/0091350 A1 | 4/2014 | Katsuno et al. |
| 2014/0095061 A1 | 4/2014 | Hyde |
| 2014/0111546 A1 | 4/2014 | Utagawa |
| 2014/0119993 A1 | 5/2014 | Rhodes |
| 2014/0125500 A1 | 5/2014 | Baade |
| 2014/0125501 A1 | 5/2014 | Baade |
| 2014/0129426 A1 | 5/2014 | Lamb et al. |
| 2014/0143169 A1 | 5/2014 | Lozito |
| 2014/0147280 A1 | 5/2014 | Kowatsch |
| 2014/0157510 A1 | 6/2014 | Mjelde |
| 2014/0167821 A1 | 6/2014 | Yang et al. |
| 2014/0180567 A1 | 6/2014 | Fetsch |
| 2014/0183376 A1 | 7/2014 | Perkins |
| 2014/0195261 A1 | 7/2014 | Rasquinha et al. |
| 2014/0201064 A1 | 7/2014 | Jackson et al. |
| 2014/0210503 A1 | 7/2014 | Tam |
| 2014/0215190 A1 | 7/2014 | Mylius et al. |
| 2014/0220966 A1 | 8/2014 | Muetzel et al. |
| 2014/0267688 A1 | 9/2014 | Aich et al. |
| 2015/0006207 A1 | 1/2015 | Jarvis et al. |
| 2015/0019270 A1 | 1/2015 | Jarvis et al. |
| 2015/0024727 A1 | 1/2015 | Hale-Pletka et al. |
| 2015/0032291 A1 | 1/2015 | Lowrey et al. |
| 2015/0066362 A1 | 3/2015 | Meyer et al. |
| 2015/0067312 A1 | 3/2015 | Lewandowski et al. |
| 2015/0168173 A1 | 6/2015 | Lewis-Evans et al. |
| 2015/0260529 A1 | 9/2015 | Petersen |
| 2015/0332525 A1 | 11/2015 | Harris et al. |

FOREIGN PATENT DOCUMENTS

| | | |
|---|---|---|
| CA | 2709740 A1 | 7/2009 |
| CA | 2712576 A1 | 2/2011 |
| CA | 2828835 A1 | 4/2014 |
| CA | 2832185 A1 | 5/2014 |
| CN | 2921908 Y | 7/2007 |
| CN | 101192322 A | 6/2008 |
| CN | 101240734 A | 8/2008 |
| CN | 101734228 A | 6/2010 |
| CN | 102779407 A | 11/2012 |
| CN | 103813477 A | 5/2014 |
| CN | 104931066 A | 9/2015 |
| DE | 4423328 A1 | 1/1996 |
| EP | 0096252 A2 | 12/1983 |
| EP | 0393935 A2 | 10/1990 |
| EP | 0451482 A1 | 10/1991 |
| EP | 0519630 A2 | 12/1992 |
| EP | 0744727 A2 | 11/1996 |
| EP | 0581558 B1 | 4/1997 |
| EP | 0795760 A3 | 4/1999 |
| EP | 0806632 B1 | 4/1999 |
| EP | 0660083 B1 | 9/2000 |
| EP | 0795700 B1 | 11/2001 |
| EP | 1191500 A1 | 3/2002 |
| EP | 0767448 B1 | 12/2002 |
| EP | 0785132 B1 | 5/2003 |
| EP | 1324241 A1 | 7/2003 |
| EP | 1384635 A1 | 1/2004 |
| EP | 0763713 B1 | 5/2004 |
| EP | 1752949 A1 | 2/2007 |
| EP | 1777541 A1 | 4/2007 |
| EP | 1785744 A1 | 5/2007 |
| EP | 1791101 B1 | 2/2008 |
| EP | 1912191 A1 | 4/2008 |
| EP | 1944190 A1 | 7/2008 |
| EP | 1760655 A3 | 9/2008 |
| EP | 2000889 A2 | 12/2008 |
| EP | 1870788 B1 | 10/2009 |
| EP | 1894779 B1 | 11/2009 |
| EP | 1975563 A3 | 11/2009 |
| EP | 1975565 A3 | 11/2009 |
| EP | 1804223 B1 | 12/2009 |
| EP | 1927961 B1 | 1/2010 |
| EP | 2154026 A1 | 2/2010 |
| EP | 2339562 A1 | 6/2011 |
| EP | 2418461 A1 | 2/2012 |
| EP | 2528043 A1 | 11/2012 |
| EP | 1975566 A3 | 12/2012 |
| EP | 1742083 B1 | 1/2013 |
| EP | 1895273 A3 | 1/2013 |
| EP | 2747004 A1 | 6/2014 |
| JP | 2006123891 A | 5/2006 |
| JP | 2014170000 A | 9/2014 |
| WO | 1984001823 A1 | 5/1984 |
| WO | 1998034314 A1 | 8/1998 |
| WO | 1999063357 A1 | 12/1999 |
| WO | 2000070530 A1 | 11/2000 |
| WO | 2001024393 A1 | 4/2001 |
| WO | 2001059601 A1 | 8/2001 |
| WO | 2001075472 A2 | 10/2001 |
| WO | 2002019683 A1 | 3/2002 |
| WO | 2002089077 A1 | 11/2002 |
| WO | 2003012473 A1 | 2/2003 |
| WO | 2003034089 A2 | 4/2003 |
| WO | 2003036462 A1 | 5/2003 |
| WO | 2003079717 A2 | 9/2003 |
| WO | 2004009473 A1 | 1/2004 |
| WO | 2004051594 A2 | 6/2004 |
| WO | 2004075090 A1 | 9/2004 |
| WO | 2004086076 A2 | 10/2004 |
| WO | 2004102536 A2 | 11/2004 |
| WO | 2005008603 A1 | 1/2005 |
| WO | 2006053566 A1 | 5/2006 |

(56) References Cited

FOREIGN PATENT DOCUMENTS

| WO | 2008034097 A2 | 3/2008 |
| --- | --- | --- |
| WO | 2008118578 A2 | 10/2008 |
| WO | 2008141456 A1 | 11/2008 |
| WO | 2009058972 A2 | 5/2009 |
| WO | 2009080070 A1 | 7/2009 |
| WO | 2009097595 A1 | 8/2009 |
| WO | 2009112305 A1 | 9/2009 |
| WO | 2009158469 A1 | 12/2009 |
| WO | 2011011544 A1 | 1/2011 |
| WO | 2011037766 A2 | 3/2011 |
| WO | 2011037800 A2 | 3/2011 |
| WO | 2011070534 A2 | 6/2011 |
| WO | 2013016581 A1 | 1/2013 |
| WO | 2014008752 A1 | 1/2014 |
| WO | 2014062668 A1 | 4/2014 |

OTHER PUBLICATIONS

"Accuracy and Resource Consumption in Tracking and Location Prediction", 8th International Symposium, Jul. 2003 by Ouri Wolfson et al. (pp. 4) http://link.springer.com/chapter/10.1007/978-3-540-45072-6_19.

"A Heuristic Moving Vehicle Location Prediction Technique Via Optimal Paths Selection With Aid of Genetic Algorithm and Feed Forward Back Propagation Neural Network", Journal of Computer Science, Dec. 12, 2012 by Baby Anitha, E. et al. (pp. 9) http://citeseerx.ist.psu.edu/viewdoc/download?doi=10.1.1.687.3596&rep=rep1&type=pdf.

"Location Estimation and Trajectory Prediction of Moving Lateral Vehicle Using Two Wheel Shapes Information in 2-D Lateral Vehicle Images by 3-D Computer Vision Techniques", IEEE Xplore, Sep. 14-19, 2003 by Chih-Chiun Lai et al. (p. 1) http://ieeexplore.ieee.org/xpl/articleDetails.jsp?arnumber=1241704.

"Adaptive Location Prediction Strategies Based on a Hierarchical Network Model in a Cellular Mobile Environment", The Computer Journal, May 1999 by Sajal K. Das et al. (p. 1) https://goo.gl/C27yaT.

"Automatic Transit Tracking, Mapping, and Arrival Time Prediction Using Smartphones", ACM Digital Library, Nov. 1-4, 2011 by James Biagioni et al. (pp. 14) https://www.cs.uic.edu/~jakob/papers/easytracker-sensys11.pdf.

"Location Prediction and Queries for Tracking Moving Objects", IEEE Xplore, 2000 by O. Wolfson et al. (p. 1) http://ieeexplore.ieee.org/xpl/articleDetails.jsp?arnumber=839495.

"A Novel Vehicular Location Prediction Based on Mobility Patterns for Routing In Urban VANET", EURASIP Journal on Wireless Communications and Networking, Dec. 2012 by Guangtao Xue et al. (pp. 28) http://link.springer.com/article/10.1186/1687-1499-2012-222.

"Vision-Based Vehicle Detection System With Consideration of the Detecting Location", IEEE Xplore, Apr. 3, 2012 by Minkyu Cheon et al. (p. 1) http://ieeexplore.ieee.org/xpl/articleDetails.jsp?arnumber=6175131.

"A Vehicle Detection Approach Based on Multi-Features Fusion in the Fisheye Images", IEEE Xplore, Mar. 11-13, 2011 by Guangtao Cheng et al. (p. 1) http://ieeexplore.ieee.org/xpl/articleDetails.jsp?arnumber=5763840.

"Save Money on Fleet Fueling Purchases", Sokolis Group Fuel Managment, Jan. 26, 2011 by Sokolis (p. 1) http://www.sokolisgroup.com/blog/save-money-on-fleet-fueling-purchases/.

"Sensor-based Logistics: Monitoring Shipment Vital Signs in Real Time", Inbound Logistics, Jun. 2013 by Chris Swearingen (pp. 2) http://www.inboundlogistics.com/cms/article/sensor-based-logistics-monitoring-shipment-vital-signs-in-real-time/.

"Electronic Cargo Tracking System and Solution, Intermodal Real-time Container Tracking and Rail Car Transport Security Tracking System for End-to-End Supply Chain Security System and Tracking Solution", Cargo Tracking Solution & intermodal Transport Monitoring, Avante International Technology, Inc. in 2001-2015 (pp. 11) http://www.avantetech.com/products/shipping/.

"Sea Container Tracking Methods", Moving-Australia, 2012 (pp. 3) http://www.moving-australia.co.uk/container/tracking-methods.php.

"GlobalTag for Global Visibility and Tracking", Global Tracking Technology, in 2015 (pp. 5) http://globaltrackingtechnology.com/globaltag-for-global-visibility.html.

"The Course of the 'Connected' Car", It Is Innovation, Emphasis on safety, Jan. 6, 2013 by Murray Slovick (pp. 4) http://www.ce.org/i3/Features/2013/January-February/The-Course-of-the-Connected-car.aspx.

"Cooperating Embedded Systems and Wireless Sensor Networks", John Wiley & Sons, Inc., ISBN: 978-1-84821-000-4, Mar. 10, 2008 by Michel Banâtre et al. (pp. 2) http://as.wiley.com/WileyCDA/WileyTitle/productCd-1848210000.html.

"Mitsubishi Motors Develops New Driver Support System", Mitsubishi Motors, Dec. 15, 1998 (pp. 5) http://www.mitsubishi-motors.com/en/corporate/pressrelease/corporate/detail429.html.

"Vehicle Tracking for an Evasive Manoeuvres Assistant Using Low-Cost Ultrasonic Sensors", EBSCO Host Connections, 2014, vol. 14 Issue 12, p. 22689, Dec. 2014 by Jiménez, Felipe et al. (p. 1) http://connection.ebscohost.com/c/articles/100145890/vehicle-tracking-evasive-manoeuvres-assistant-using-low-cost-ultrasonic-sensors.

"The End of Demographics: How Marketers Are Going Deeper With Personal Data", Mashable Journal, in Jul. 1, 2011 by Jamie Beckland (pp. 7) http://mashable.com/2011/06/30/psychographics-marketing/.

"Power cycling 101: Optimizing energy use in advanced sensor products", Analog Dialogue, vol. 44, Aug. 2010 by Mark Looney (pp. 7) http://www.analog.com/library/analogdialogue/archives/44-08/power_cycling.html.

* cited by examiner

LOCATION AND EVENT CAPTURE CIRCUITRY TO FACILITATE REMOTE VEHICLE LOCATION PREDICTIVE MODELING WHEN GLOBAL POSITIONING IS UNAVAILABLE

CLAIM OF PRIORITY

This patent application claims priority to and hereby incorporates by reference the entirety of the disclosures of:
(1) U.S. Provisional Patent Application 62/145,508 titled SYSTEM AND METHOD FOR PREDICTIVE RECOMMENDATION OF A TARGET VEHICLE'S FUTURE LOCATION FOR REPOSESSION and filed on Apr. 9, 2015; and to
(2) U.S. Utility application Ser. No. 14/145,914, titled CREDITOR ALERT WHEN A VEHICLE ENTERS AN IMPOUND LOT and filed on Dec. 31, 2013.

FIELD OF TECHNOLOGY

This disclosure relates generally to automotive technology and, more particularly, to a method, a device and/or a system of location and event capture circuitry to facilitate remote vehicle location predictive modeling when global positioning is unavailable.

BACKGROUND

A borrower and a lender may enter into an agreement wherein the borrower may purchase or lease a vehicle which they make payments on over a period of time. When a borrower defaults on their payments, the lender may eventually be left with no other option but repossession. Once this point has been reached, it is in the best interest of the lender to repossess the vehicle as quickly as possible, to prevent costs associated with damage to the vehicle. In many cases, by the time repossession is being considered, the lender has spent time negotiating with the borrower. This may give the borrower time to locate and disable any sort of tracking device which the lender may rely on to locate the vehicle. This may complicate locating the vehicle for repossession.

A further complication stems from the fact that repossession may be extremely difficult, if not impossible, in certain circumstances, such as when the car is in a locked garage or the secured parking lot of an employer. Not only does the repossessor have to locate the vehicle, they must locate the vehicle at a time when it is obtainable. Additionally, vehicle repossession may be a very emotionally charged situation. An ideal scenario for repossessing a vehicle is one where the borrower is unaware of the repossession, or at the very least is in an environment which may inhibit a confrontation.

SUMMARY

Disclosed are a method, a device and/or a system of location and event capture circuitry to facilitate remote vehicle location predictive modeling when global positioning is unavailable.

In one aspect, a predictive circuit of a vehicle includes an event detection circuitry to initiate a timer circuit of the vehicle when a wheel of the vehicle is in a stationary state beyond a threshold amount of time during an event; an event categorization circuitry to monitor a telemetry data of the vehicle to assign a category to the event; a data communication circuitry to communicate the event, the category, and a set of other events and categories to a predictive recommendation server on a periodic basis; and a repossession detection circuitry to determine that the vehicle is pending repossession based on the event, the category, the set of other events and categories, and/or a message communicated from the predictive recommendation server to the predictive circuit.

The event may be associated with a time of day, a day of a week, a calendar day, and/or an event type (e.g., by the predictive circuit and/or the predictive recommendation server). The event type may be a home location, a work location, a day location, an evening location, a weekend location, a night location, and/or a holiday location. A location of the vehicle may be determined through a triangulation algorithm of the data communication circuitry of the predictive circuit, and/or a mobile device associated with a user of the vehicle. The user of the vehicle may be identified as a primary user of the vehicle, and/or a secondary user of the vehicle. The triangulation algorithm may be applied to the mobile device when the mobile device is paired with the vehicle through a short range communication algorithm. The mobile device may be detected using the predictive circuit to have a latitudinal and longitudinal location change with nearby cellular towers in a pattern consistent with a movement of the vehicle. The short range communication algorithm may be Bluetooth®, BLE®, Zigbee®, and/or another personal area network (PAN).

The telemetry data may be determined based on an engine motor status, an accelerator status, a time of pause, a brake status, a park status, an occupant sensor status, a door status, a window status, a hood status, a truck status, a tailgate status, an in-car entertainment system status, an air-conditioning status, an in-car electronic system status, a neutral status and/or an other car status. The predictive circuit and the predictive recommendation server may generate a statistical probability matrix of a set of predictive potential locations of the vehicle as a function of time based on an analysis of historical data.

The predictive circuit and/or the predictive recommendation server may generate a stop report and/or a drive report. The predictive circuit and/or the predictive recommendation server may determine an accuracy of the statistical probability matrix. An artificial intelligence algorithm may be applied when generating the statistical probability matrix. The periodic basis may be 25 hours to enable an hourly cycling of the event and the set of other events from the data communication circuitry to the predictive recommendation server. The event data and the set of other events may be transmitted in real time, an active period, and/or a batch mode from a locally stored cache storing event data since a previous transmittal to the predictive recommendation server.

In other aspect, a method of predictive circuit of a vehicle includes initiating a timer circuit of the vehicle when a wheel of the vehicle is in a stationary state beyond a threshold amount of time during an event using a processor and a memory of an event detection circuitry; monitoring a telemetry data of the vehicle to assign a category to the event using an event categorization circuitry; communicating the event, the category, and a set of other events and categories to a predictive recommendation server on a periodic basis using a data communication circuitry; and determining using a repossession detection circuitry that the vehicle is pending repossession based on the event, the category, the set of other events and categories, and/or a message communicated from the predictive recommendation server to the predictive circuit.

In yet other aspect, a predictive circuit of a vehicle includes an event detection circuitry to initiate a timer circuit of the vehicle when a wheel of the vehicle is in a stationary state beyond a threshold amount of time during an event; an event categorization circuitry to monitor a telemetry data of the vehicle to assign a category to the event; a data communication circuitry to communicate the event, the category, and a set of other events and categories to a predictive recommendation server on a periodic basis; and a repossession detection circuitry to determine that the vehicle is pending repossession based on the event, the category, the set of other events and categories, and/or a message communicated from the predictive recommendation server to the predictive circuit.

The predictive circuit stops the timer circuit when the wheel of the vehicle changes to a rotating state when the vehicle is in motion in this yet another aspect. The timer circuit may calculate a total time to stop. The total time can be associated with the event in this yet another embodiment.

The method, apparatus, and system disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the Figures of the accompanying drawings, in which like references indicate similar elements and in which:

In FIG. 10, various circuits that enable various embodiments described herein are implemented through a combination of hardware and/or software circuitry.

Figure 1:
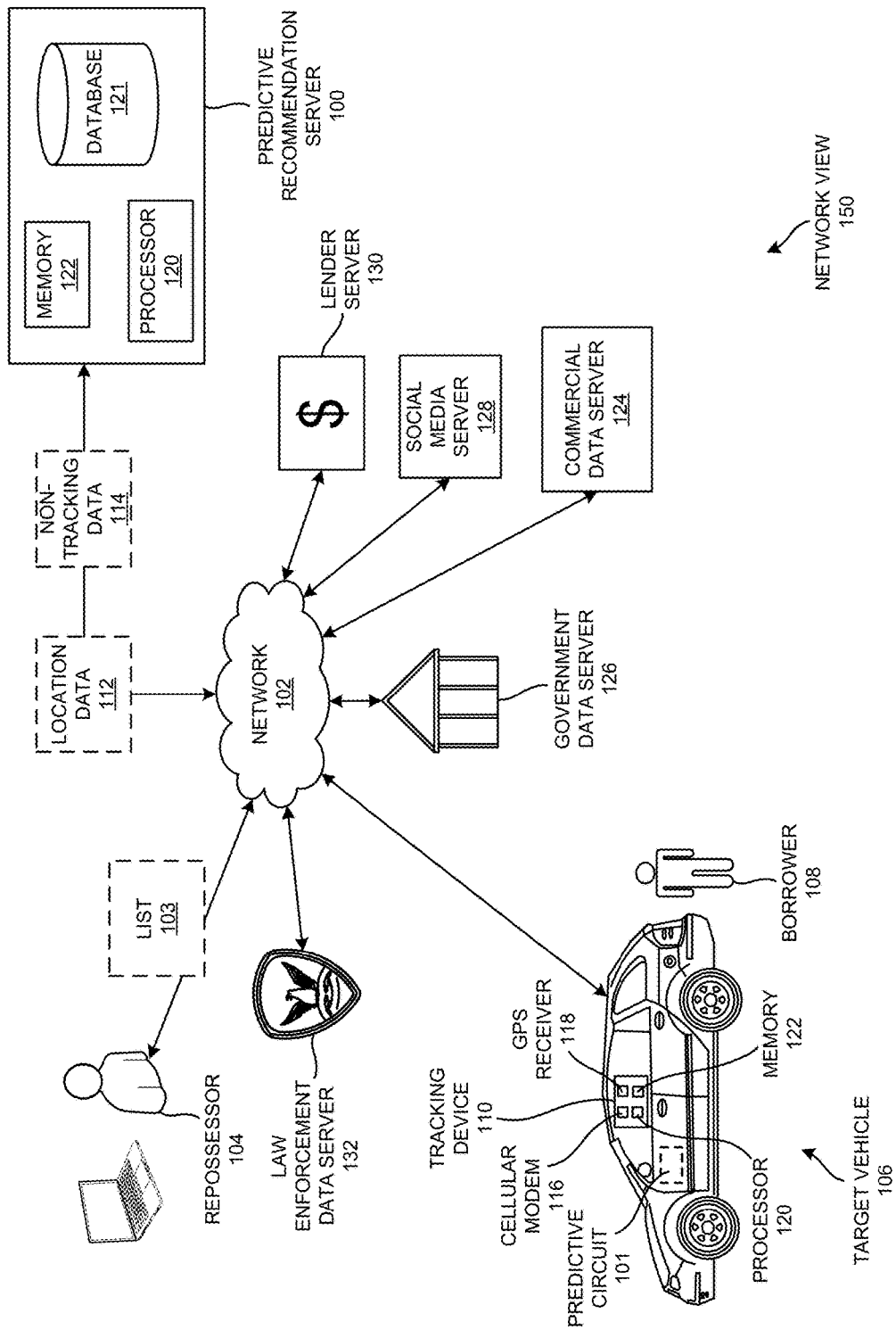
FIG. 1 is a network view illustrating a predictive recommendation server receiving data from a variety of sources to predict the location of a target vehicle, according to one embodiment.

Other features of the present embodiments will be apparent from the accompanying drawings and from the detailed description that follows.

DETAILED DESCRIPTION

Example embodiments, as described below, may be used to provide a system, method, and/or apparatus of location and event capture circuitry to facilitate remote vehicle location predictive modeling when global positioning is unavailable.

In one embodiment, a repossession recommendation system includes a predictive recommendation server 100, which may itself include a processor 120, a memory 122, and a database 121. The repossession recommendation system also includes a network 102. The predictive recommendation server 100 may be configured to collect a set of location data 112 for a target vehicle 106 associated with a borrower 108, create a plurality of destination zones 202, and determine a geographic boundary 204 of each of the plurality of destination zones 202. The predictive recommendation server 100 may further be configured to group a set of visits 200 within each destination zone 202, determine a frequency of visits for each destination zone 202, and collect a set of non-tracking data 114.

The predictive recommendation server 100 may run a predictive model, and present to a repossessor 104 a list of recommended destination zones and times 103 to repossess the target vehicle 106. The set of location data 112 and the set of non-tracking data 114 may be collected from a tracking device 110, a commercial data server 124, a government data server 126, a social media server 128, a lender server 130, and/or a law enforcement server 132. The tracking device 110 may include a cellular modem 116, a GPS receiver 118, a processor 120 and/or a memory 122.

In another embodiment, a method of a predictive recommendation server 100 includes collecting a set of location data 112 for a target vehicle 106, creating a plurality of destination zones 202, determining a geographic boundary 204 of each of the plurality of destination zones 202, and grouping a set of visits 200 within each destination zone 202. The method further includes determining a frequency of visits for each destination zone 202, collecting a set of non-tracking data 114, and running a predictive model. Finally, the method includes presenting to a repossessor 104 a list of recommended destination zones and times 103 to repossess the target vehicle 106.

Running the predictive model may include determining a set of relevant input data for the predictive model, standardizing and/or removing incomplete data, and identifying a set of baseline control data. Running the predictive model may also include generating prediction scores associated with each baseline location, time, and/or day by detecting patterns within the baseline control data, comparing vehicle locations predicted by the detected patterns with a set of baseline control locations, and selecting a best predictive pattern for the target vehicle 106.

Running the predictive model may further include incorporating a set of supplemental location data 112 and/or non-tracking data 114, generating prediction scores for each destination zone, time, and/or day, and comparing prediction scores for each destination zone, time, and/or day. Finally, running the predictive model may include generating a set of recommendations for the best time and/or days to repossess within each destination zone, generating a set of recommendations for the best destination zones to repossess the target vehicle 106 for a particular time and/or a particular day, and generating the list of recommended destination zones and/or times to repossess the target vehicle 106.

FIG. 1 is a network view 150 illustrating a predictive recommendation server 100 receiving data from a variety of sources to predict the location of a target vehicle 106, according to one embodiment. Particularly, FIG. 1 illustrates a predictive recommendation server 100, a network 102, a list of recommended destination zones and times 103, a repossessor 104, a target vehicle 106, a borrower 108, a tracking device 110, a set of location data 112, a set of non-tracking data 114, a cellular modem 116, a GPS receiver 118, a processor 120, a database 121, a memory 122, a commercial data server 124, a government data server 126, a social media server 128, a lender server 130, and a law enforcement server 132.

The predictive recommendation server 100 may be a computer or computer program which may manage access to the predicted locations of vehicles needing to be repossessed, and/or recommended locations, days of the week, and/or time of day which represent optimal conditions of repossession for a target vehicle 106. In the context of the present description, optimal conditions for repossession may refer to conditions most conducive to a successful repossession of a vehicle, maximizing efficiency and minimizing the likelihood of confrontation or conflict with the borrower 108.

In the context of the present description, a server (e.g., the predictive recommendation server 100, the commercial data server 124, the government data server 126, the social media server 128, the lender server 130, the law enforcement server 132, etc.) may implemented in one of a variety of environments. For example, in one embodiment, a server may exist as a discrete set of physical computers. In another embodiment, a server may be a cloud-based service. In still another embodiment, a server may exist as a virtual machine, running on dedicated hardware or within a shared multi-tenant environment.

The network 102 may be a system of interconnected computers configured to communicate with each other (e.g., the internet, etc.). The list of recommended destination zones and times 103 to repossess the target vehicle 106 may be a list of locations (e.g. specific locations, a bounded geographic area, etc.) and times which are predicted to provide optimal conditions for repossessing the target vehicle 106.

The repossessor 104 may be a person, company, or other entity with an interest in repossessing an item (e.g., the target vehicle 106, etc.) when a borrower 108 defaults on payments. In one embodiment, the repossessor 104 may be a dispatcher of a towing company. In another embodiment, the repossessor 104 may be a tow truck operator. In yet another embodiment, the repossessor 104 may be the lender, who may direct another individual or entity to repossess the target vehicle 106.

The target vehicle 106 may be a vehicle which has been selected for repossession. The borrower 108 may be an individual or entity which owes a debt to another entity, a debt which was incurred to purchase a vehicle. The tracking device 110 may be a device which may determine it's own location (e.g., using a GPS receiver 118, detecting wireless networks, etc.) and report it's own location to a server (e.g. using a cellular modem 116). In some embodiments, the tracking device 110 may be attached to the target vehicle 106 by a third party (e.g., a lender, a car dealer, an auto insurance provider, etc.). In other embodiments, the tracking device 110 may be incorporated within the vehicle by the vehicle manufacturer.

The set of location data 112 may be a set of data which describes the location of a target vehicle 106 over a period of time. In one embodiment, the set of location data 112 may be a collection of coordinate pairs describing the location of a target vehicle 106 at different points in time. In some embodiments, the set of location data 112 may be limited to a geographic location and a time. In other embodiments, the set of location data 112 may further comprise a speed, indicating whether the vehicle was in motion when the location entry was determined and recorded. According to various embodiments, the set of location data 112 may be obtained from a variety of sources including, but not limited to, a tracking device 110, a commercial data server 124, a government data server 126, a social media server 128, a lender server 130, and/or a law enforcement server 132.

The set of non-tracking data 114 may be a set of data which has at least a partial association with the operation of the target vehicle 106, yet does not indicate a specific location of the target vehicle 106. The non-tracking data 114 may be used to help determine the likelihood of a successful repossession at a particular location, according to one embodiment. For example, the nature of the parking at a location (e.g., street, driveway, garage, parking structure, gated lot, etc.) may raise or lower the chance that a target vehicle 106 could be successfully repossessed. In another embodiment, the non-tracking data 114 may be used by a predictive model to help identify patterns in the operation of the vehicle (e.g., when certain weather conditions are present, the vehicle is likely to be found near a particular beach, etc.). According to various embodiments, the set of non-tracking data 114 may be obtained from a variety of sources including, but not limited to a commercial data server 124, a government data server 126, a social media server 128, a lender server 130, and/or a law enforcement server 132.

The cellular modem 116 may be device which is able to transmit and/or receive digital information by modulating and demodulating signals transmitted over a cellular network. The GPS receiver 118 may be a device which may receive signals from one or more GPS satellites, thereby determining the geographical location of the GPS receiver 118. The processor 120 may be a central processing unit capable of executing a program. The database 121 may be an organized collection of data held in a computer. The memory 122 may be the part of a computer in which data and/or programming instructions (e.g., executables, etc.) are stored.

The commercial data server 124 may be a computer server operated by a commercial entity. In various embodiments, the commercial data server 124 may provide location data 112. For example, in one embodiment, a commercial data server 124 (e.g., a server maintained by a car manufacturer who has installed a tracking device 110 at the time of manufacture, a server provided by a third-party roadside assistance service such as OnStar, a server operated by auto insurance agency, a server provided by a fleet management company, a server associated with a mobile application which is running on a mobile device associated with the borrower 108, etc.) may provide data which identifies the location of the target vehicle 106, as determined by a GPS receiver 118 or other geolocation technology.

In other embodiments, the commercial data server 124 may provide non-tracking data 114. For example, in one embodiment, a commercial data server 124 may provide information including, but not limited to, results of previous repossession attempts (e.g., attempts made for that particular vehicle, attempts made by a particular firm, attempts made in a particular geographic area, etc.), the geographic location of the repossessor 104 and/or their agents (e.g., tow yards, tow trucks, etc.), map data, point of interest data (e.g., enabling the identification of a cluster of previous visits to an area as visits to a shopping mall, etc.), business listings, white-page directories, and/or weather reports (e.g., enabling the identification of weather-related patterns in the location of the vehicle, etc.).

In another embodiment, a commercial data server 124 may provide satellite imagery, which may be analyzed to determine the viability of a particular location for repossession. As a specific example, a commercial data server 124 may provide satellite imagery for the area near a borrower's home. An analysis performed manually (e.g., using human judgment, etc.) or programmatically (e.g., using machine vision algorithms, etc.) may identify that the borrower 108 does not have a garage, and must therefore park the target vehicle 106 on the street.

The government data server 126 may be a computer server operated by a government entity. In various embodiments, the government data server 126 may provide location data 112. For example, in one embodiment, the government data server 126 may provide information which may be used to identify previous locations of the target vehicle 106, which may then be used to identify patterns. Examples of such information may include, but are not limited to, recorded use of toll roads, parking lot cameras, and/or other license plate recognition data.

In other embodiments, the government data server 126 may provide non-tracking data 114. For example, in one embodiment, the government data server 126 may provide real-time traffic conditions and/or construction alerts, which may modify the behavior patterns identified in historical data. In another embodiment, the government data may identify the zoning type of different geographic areas, which may allow certain inferences to be made when identifying patterns.

The social media server 128 may be a computer server which enables user communication within a social network. In various embodiments, the social media server 128 may provide location data 112. Examples of such data include, but are not limited to, check-ins (e.g., Yelp, Foursquare, Waze, etc.), geotagged postings (e.g., posts to social networks which are tagged with locations, etc.), and/or reviews (e.g., reviews of specific businesses such as restaurants, etc.) In other embodiments, the social media server 128 may provide non-tracking data 114. For example, in one embodiment, a social networked traffic service (e.g., Waze, etc.) may provide real-time traffic conditions.

The lender server 130 may be a computer server operated by a lender. In various embodiments, the lender and/or their server may be a source of location data 112 (e.g., data received from a tracking device 110 required by the terms of a loan or lease, etc.) and/or non-tracking data 114 (e.g., information about the borrower 108, vehicle title history, etc.). As a specific example, a lender server 130 may provide information regarding the borrower's residence, place of employment, and nearby family members.

The law enforcement data server 132 may be a computer server operated by a law enforcement agency. In various embodiments, the law enforcement data server 132 may be a source of location data 112, identifying specific locations the vehicle has been at in the past. Examples of such data include, but are not limited to, parking tickets, traffic violations, and/or license plate recognition data.

In other embodiments, the law enforcement data server 132 may provide non-tracking data 114 which may be used to modify previously observed patterns to account for current events, or help identify optimal repossession locations and times. This non-tracking data 114 may include, but is not limited to, dispatch alerts and/or location crime indices.

As shown in FIG. 1, the predictive recommendation server 100 is communicatively coupled with the commercial data server 124, the government data server 126, the social media server 128, the lender server 130, and the law enforcement server 132 through the network 102. In some embodiments, the predictive recommendation server 100 may be communicatively coupled to the tracking device 110 within the target vehicle 106. In other embodiments, the predictive recommendation server 100 may receive location data 112 resolved by a tracking device 110 within the target vehicle 106 via a commercial data server 124 (e.g., a third party receives the location data 112 directly from the tracking device 110 and then makes it available to the predictive recommendation server 100, etc.).

FIG. 1 illustrates a communicative coupling between the predictive recommendation server 100 and a computing device associated with the repossessor 104. In some embodiments, the predictive recommendation server 100 may communicate with the repossessor 104 through a web interface or portal. In other embodiments, the predictive recommendation server 100 may communicate with the repossessor 104 through an application specific to the purpose of locating vehicles. As an option, a repossessor 104 or their agent may interact with the predictive recommendation server 100 through a mobile application on a smartphone (e.g., a tow truck driver may obtain routing information from the application while away from the tow yard, etc.).

A borrower 108 may enter into an agreement with a lender, allowing them to obtain a vehicle in exchange for agreeing to make payments over a period of time. The borrower 108 may also agree to allow the lender to monitor the location of the vehicle, perhaps even installing a tracking device 110 which reports the location of the vehicle. In one embodiment, the tracking device 110 may determine the location of the vehicle and report to a server or database on a regular schedule. As an option, the schedule may be designed to minimize the bandwidth needed to report the location data 112; the schedule may also rotate, observing the location at a different time each day.

In another embodiment, the tracking device 110 may determine and report the location upon the occurrence of one or more triggering events. One example of a triggering event is when the transmission of the target vehicle 106 is placed into park. Another example may be when an accelerometer on the tracking device 110 determines that the vehicle has stopped moving. Yet another example is when the ignition of the target vehicle 106 is turned off and/or the key is removed.

As shown in FIG. 1, the predictive recommendation server 100 collects location data 112 and non-tracking data 114 from one or more sources through the network 102. Using a predictive model, the predictive recommendation server 100 generates a list 103 of recommended destination zones 202 or specific locations, as well as times of day and days of the week, which may be optimal for the repossession of the target vehicle 106. This information (e.g., list, etc.) is provided to the repossessor, who may use it to repossess the target vehicle 106 in an efficient and safe manner.

In some embodiments, the predictive recommendation server 100 may generate a list of the best places, times, and days for a repossession attempt (e.g., the server will make the best of a bad situation and provide a list of the best scenarios, even if all discernable scenarios are less than ideal). In other embodiments, the predictive recommendation server 100 may indicate that it is unable to identify a location, time, and/or day which meets the requirements specified by the repossessor 104. As an option, a repossessor 104 may instruct the predictive recommendation server 100 to continue monitoring location data 112 and non-tracking data 114 associated with a target vehicle 106 and update the predictive model; if a location/time/day is subsequently identified which meets the criteria specified by the repossessor, the predictive recommendation server 100 may notify the repossessor 104.

Figure 2:
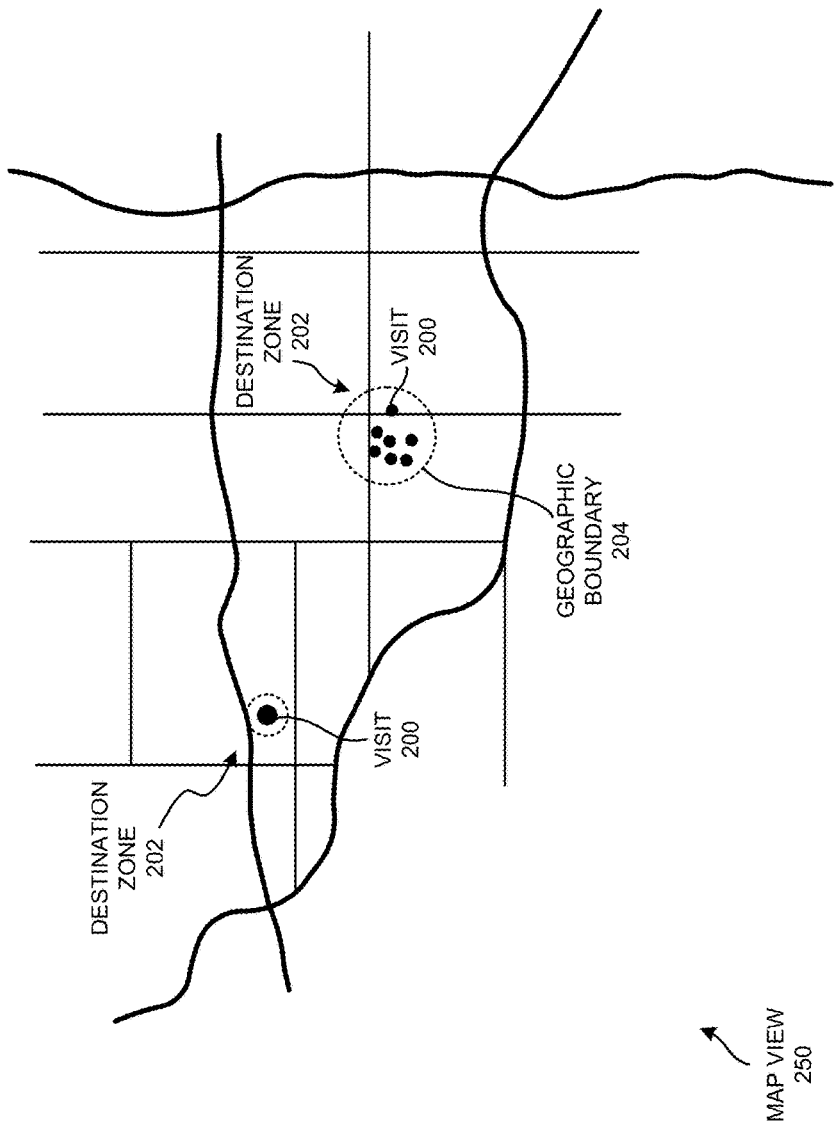
FIG. 2 is a map view of the location data of FIG. 1, according to one embodiment.

FIG. 2 is a map 502 view of the location data 112 of FIG. 1, according to one embodiment. Particularly, FIG. 2 illustrates a visit 200, a destination zone 202, and a geographic boundary 204. The visit 200 may be a location which may be inferred as an intended destination of the target vehicle 106. The destination zone 202 may be an area in which the target vehicle 106 has been observed one or more times. Using destination zones 202, rather than a large set of discrete points, may allow certain inferences to be made (e.g., the borrower 108 goes shopping on certain days, etc.) when identifying patterns. The geographic boundary 204 may be the bounds defined for a destination zone 202 which groups visits 200 with a certain level of correlation.

The use of destination zones 202 may streamline the process of detecting patterns in the observed locations of the target vehicle 106. For example, if a borrower 108 makes frequent visits 200 to the nearby shopping mall, there may be numerous visits 200 detected which are scattered throughout a large parking garage next to the mall. These visits 200 are simply instances where the borrower 108 parked the target vehicle 106 in different locations while performing the same activity (i.e., going to the mall). Grouping all of these visits 200 into a single destination zone 202 means that the predictive model only needs to be applied to the zone, rather than each individual visit. As the sophistication of the predictive model increases, the size of destination zones 202 may be reduced. In other words, with increased sophistication and/or the consideration of additional location 112 and non-tracking data 114, the model may be able to predict where within the mall parking garage the target vehicle 106 is likely to be located.

In one embodiment, the geographic boundary 204 of one destination zone 202 may overlap with the geographic boundary 204 of another destination zone 202. In such a case, the time, day, and/or context of a visit 200 may be used to determine which of the two overlapping destination zones 202 the visit 200 should be grouped with. As a specific example, destination zones 202 for a secured parking garage and unsecured street parking may have overlapping geographic boundaries 204. However, it may be observed that if the borrower 108 is arriving at that location after a certain time, the garage will be full and street parking will be used, allowing the visit 200 to be grouped with the appropriate destination zone 202.

Figure 3:
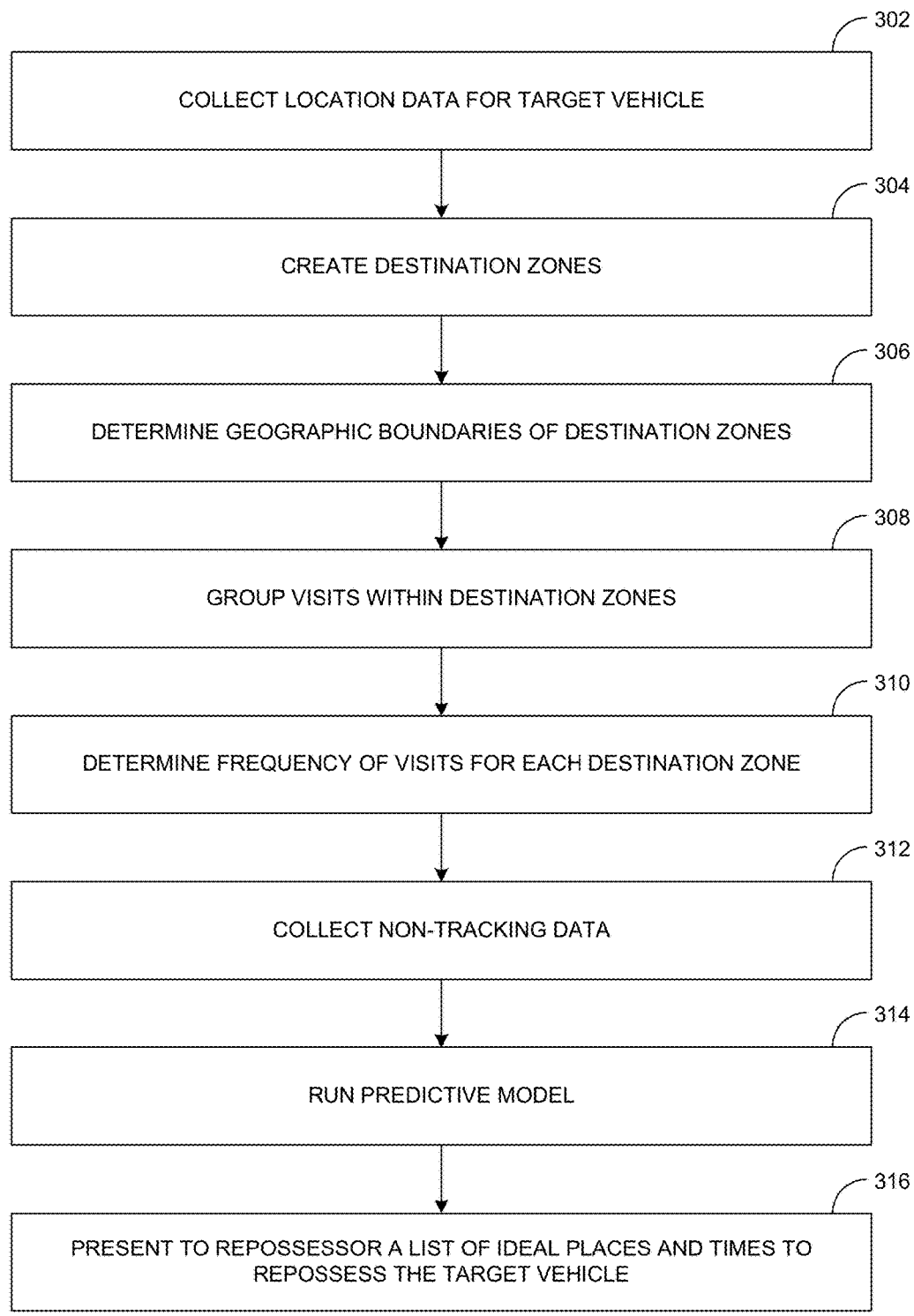
FIG. 3 is a process flow diagram of the predictive recommendation server of FIG. 1, according to one embodiment.

FIG. 3 is a process flow diagram of the predictive recommendation server 100 of FIG. 1, according to one embodiment. In operation 302, location data 112 for the target vehicle 106 may be collected. In operation 304, destination zones 202 may be created. In one embodiment, destination zones 202 may have overlapping geographic boundaries 204, yet may be distinct in other dimensions such as time of day or day of the week. For example, a borrower 108 may park on the street in some cases, and in a locked garage a few yards away in others, depending on variables such as time of day or whether it is the weekend or not.

In operation 306, geographic boundaries 204 of destination zones 202 may be determined. In one embodiment, the geographic boundaries 204 of destination zones 202 may be modified in an iterative process, such that the predictive model is optimized. This may be accomplished using a variety of computational simulation methods, such as genetic algorithms or simulated annealing. As a simplified example, a set of geographic boundaries 204 may be defined, and a prediction score may be calculated for a set of baseline control data. Then, the geographic boundaries (and any other parameter of the model) may be perturbed in some way, and the prediction score recalculated. If the score improves, the change may be kept. The process may be repeated until no further improvements are obtained.

In other embodiments, the geographic boundaries 204 may be defined using information regarding the surrounding point of interest (e.g., business listings, addresses of parking garages, machine vision analysis of satellite images, etc.) and a statistical analysis of location data 112 associated with the target vehicle 106. In operation 308, a set of visits 200 may be grouped within the destination zones 202.

In operation 310, a frequency of visits for each destination zone 202 may be determined. In the context of the present description, the frequency of visits for each destination zone 202 may be how often the target vehicle 106 is found within a destination zone 202 within a particular period of time. In determining the frequency of visits for each destination zone 202, the relevance of the destination zones 202 with respect to the predictive model may be estimated.

In operation 312, non-tracking data 114 may be collected. Non-tracking data 114 may provide additional dimensions of information through which patterns may be detected, patterns which may be used to predict future locations of the target vehicle 106.

In operation 314, a predictive model may be run. The predictive model may be a methodology used to detect patterns in the location of the target vehicle 106 and, based on those patterns, assign probabilities to potential future locations, according to one embodiment. In some embodiments, the predictive model may be calibrated and optimized using techniques such as genetic algorithms, Monte Carlo simulation, simulated annealing, and/or any other computational optimization methodology.

Finally, in operation 316, a list of recommended destination zones and times 103 to repossess the target vehicle 106 may be presented to the repossessor 104.

Figure 4:
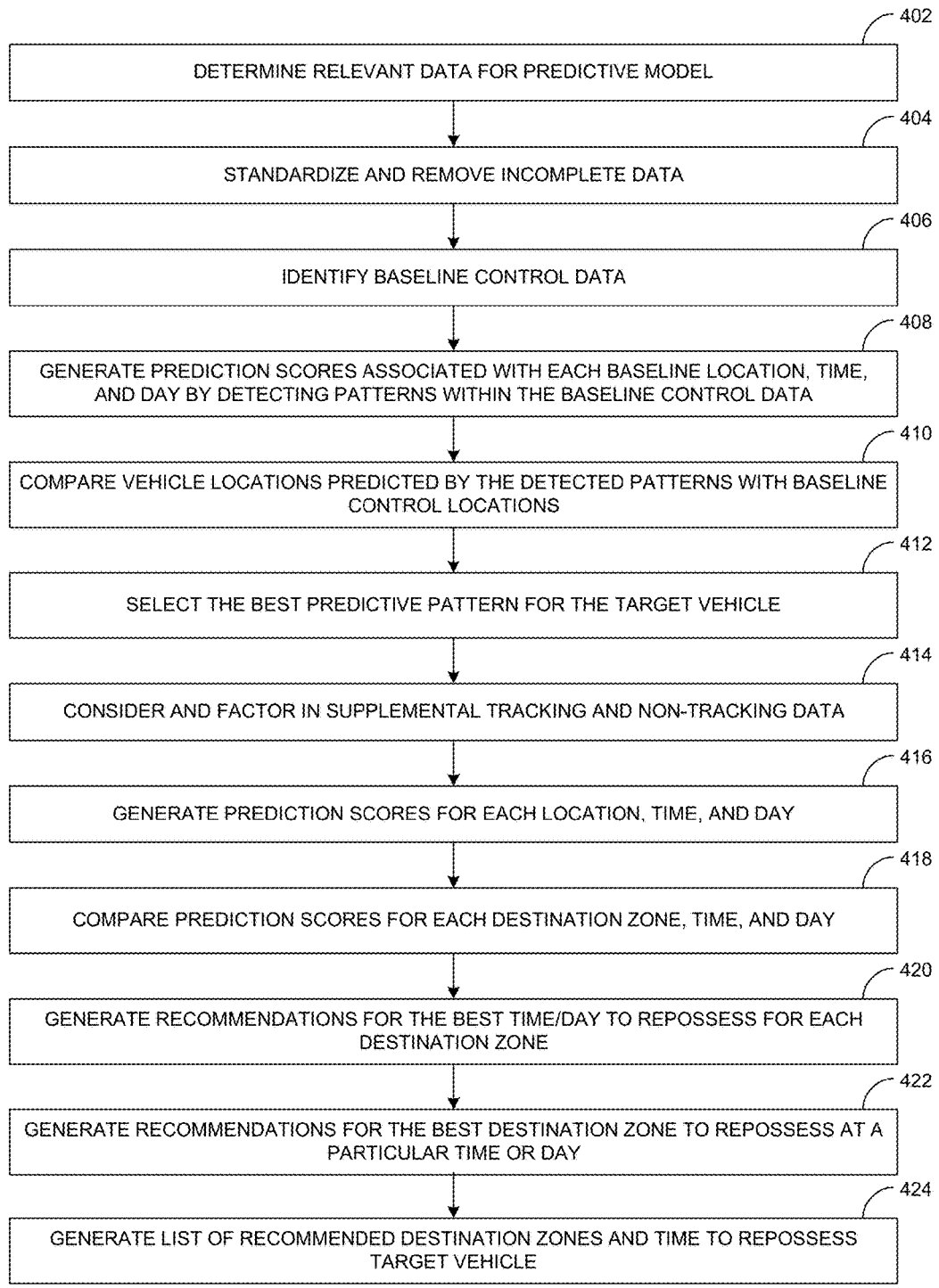
FIG. 4 is a process flow diagram of the predictive model of FIG. 3, according to one embodiment.

FIG. 4 is a process flow diagram of the predictive model of FIG. 3, according to one embodiment. In operation 402, it may be determined what input data is relevant for the predictive model. In the context of the present description, the set of relevant input data may refer to a set of data which has been determined to be relevant to a consideration of the location of the target vehicle 106.

In certain circumstances, some collected data may be given less weight than other data. For example, in one embodiment, if it is known that the borrower 108 is unemployed and may be searching for a job, observations of the target vehicle 106 at various businesses may be given less weight than similar observations for someone who is employed (e.g., in that case, those observations may lead to a usable pattern, etc.). Another example may be that data obtained from the borrower's social network posts may be given more weight if it is determined that they are consistently posting their location.

In some embodiments, data deemed below a threshold relevancy may be removed from consideration. In other embodiments, a weight may be assigned to each type and/or item of data. The weight may reflect the degree of relevance to the prediction of future locations of the target vehicle 106.

In operation 404, the input data may be standardized and incomplete data may be removed. In some embodiments, the standardization of data may include placing all data in a similar format. For example, a tracking device 110 may provide latitude and longitude coordinates, while records of parking tickets may provide a less specific location in the form of the intersection of two nearby streets.

In the context of the present description, incomplete data may refer to location data 112 and/or non-tracking data 114 which is not usable. For example, depending on the sampling rate, there may be pieces of location data 112 where it is not clear whether the vehicle was stationary (e.g., a visit 200) or moving (e.g., en route to a potential destination zone 202, etc.). As another example, some social media posts may contain useful information regarding the behavior patterns of the borrower 108, while other posts may be incomplete, as they lack sufficient context or other information to warrant being considered when seeking patterns.

In operation 406, a set of baseline control data may be identified. The set of baseline control data may be a set of data which may be used to calibrate a predictive model. For example, in one embodiment, historical data may be used as baseline control data, such that patterns observed within the historical data may be validated based upon the degree which they are able to predict subsequent, though still historical, visits of the target vehicle 106.

In operation 408, prediction scores associated with each baseline location, time, and day may be generated by detecting patterns within the baseline control data, according to one embodiment. The detected patterns may be a regular and intelligible sequence discernible in the observed and/or inferred locations of a target vehicle 106 and/or the behavior of a borrower 108. The prediction score may be a numerical value which indicates the degree of reliability with which a particular prediction methodology and/or detected pattern may indicate future locations of the target vehicle 106.

In operation 410, the vehicle locations predicted by the detected patterns may be compared with baseline control locations. The set of baseline control locations may be a set of destination zones 202 associated with a set of baseline control data. In some embodiments, the results of this comparison may determine whether the predictive model needs to be modified and the baseline control data reevaluated. Specifically, the predictive model may be refined and optimized using an iterative process whereby one or more aspects of the model (e.g., weight given to some types or items of data, definition of destination zones, what non-tracking data is relevant, etc.) are modified; the value of this modification may be determined by comparing the resulting predictions with the baseline control locations. The process may be repeated until no further improvements are obtained after a predefined number of attempts.

In operation 412, the best predictive pattern for the target vehicle 106 may be selected. The best predictive pattern for the target vehicle 106 may be a pattern which may be used to predict the location of the target vehicle 106 in a particular set of circumstances. Sometimes the most accurate pattern may not be the best pattern. As a specific example, a pattern in the vehicle location may be detected which shows when the vehicle will be parked on the street near the borrower's place of employment with a high degree of predictability. However, this pattern may not be the best predictive pattern if the borrower 108 has been laid off; in such a case, another pattern (e.g., periodic travel to visit family, shopping, recreation, etc.) with less predictability may be the best.

In operation 414, supplemental location 112 and non-tracking data 114 may be considered and factored into the prediction. The set of supplemental location 112 and non-tracking data 114 may be data which may be considered when applying the predictive model to current circumstances. As a specific example, in the scenario where a pattern has been detected that indicates that on days of heavy traffic, a borrower 108 will park their car on the street north of their place of employment, and on days of light traffic they will park in a garage on the south side of their place of employment, supplemental traffic data for the present day may be used to identify a probable location of the vehicle, according to one embodiment.

Supplemental location 112 and/or non-tracking data 114 may be used to identify which of a number of detected patterns a borrower 108 is following on a given day; these patterns may depend on a number of variables which may be dynamic and hard to foresee. Supplemental location 112 and/or non-tracking data 114 may be data obtained in real-time, according to one embodiment.

In operation 416, prediction scores for each destination zone, time, and day may be generated. In operation 418, the prediction scores for each destination zone, time, and day may be compared. In comparing the prediction scores, one or more ideal repossession scenarios may be identified.

In operation 420, recommendations for the best time/day to repossess may be generated for each destination zone. The set of recommendations for the best time and days to repossess within each destination zone 202 may be a set of times of day and/or days of the week at which repossession may be optimal, within a given destination zone.

In operation 422, recommendations for the best locations to repossess at a particular time or day may be generated. The set of recommendations for the best locations to repossess the target vehicle 106 for at least one of a particular time and a particular day may be a set of locations which, for a specified time of day and/or day of the week, represent the locations which would be optimal for a repossession attempt.

A location may be optimal for a repossession if there is a reduced likelihood of confrontation with the borrower 108 (e.g. borrower 108 unlikely to interrupt the repossession, a scenario less socially embarrassing to the borrower 108, etc.) and/or if the repossession may be performed efficiently (e.g. the vehicle is easily accessible for a particular method of repossession, etc.). A location may be considered less than optimal for a repossession if obstacles to success are detected using non-tracking data (e.g. the location is identified as a secured and inaccessible storage garage, the location or the route to the location is inaccessible due to adverse weather and/or road construction, etc.)

In some embodiments, the recommendations may be limited to specifying a destination zone 202, leaving it to a human (e.g. tow truck driver, etc.) to locate the target vehicle 106 within the destination zone 202. In other embodiments, the recommendation may be as specific as the data allows. Finally, in operation 424, the list of recommended destination zones and times 103 to repossess target vehicle 106 may be generated.

Figure 5:
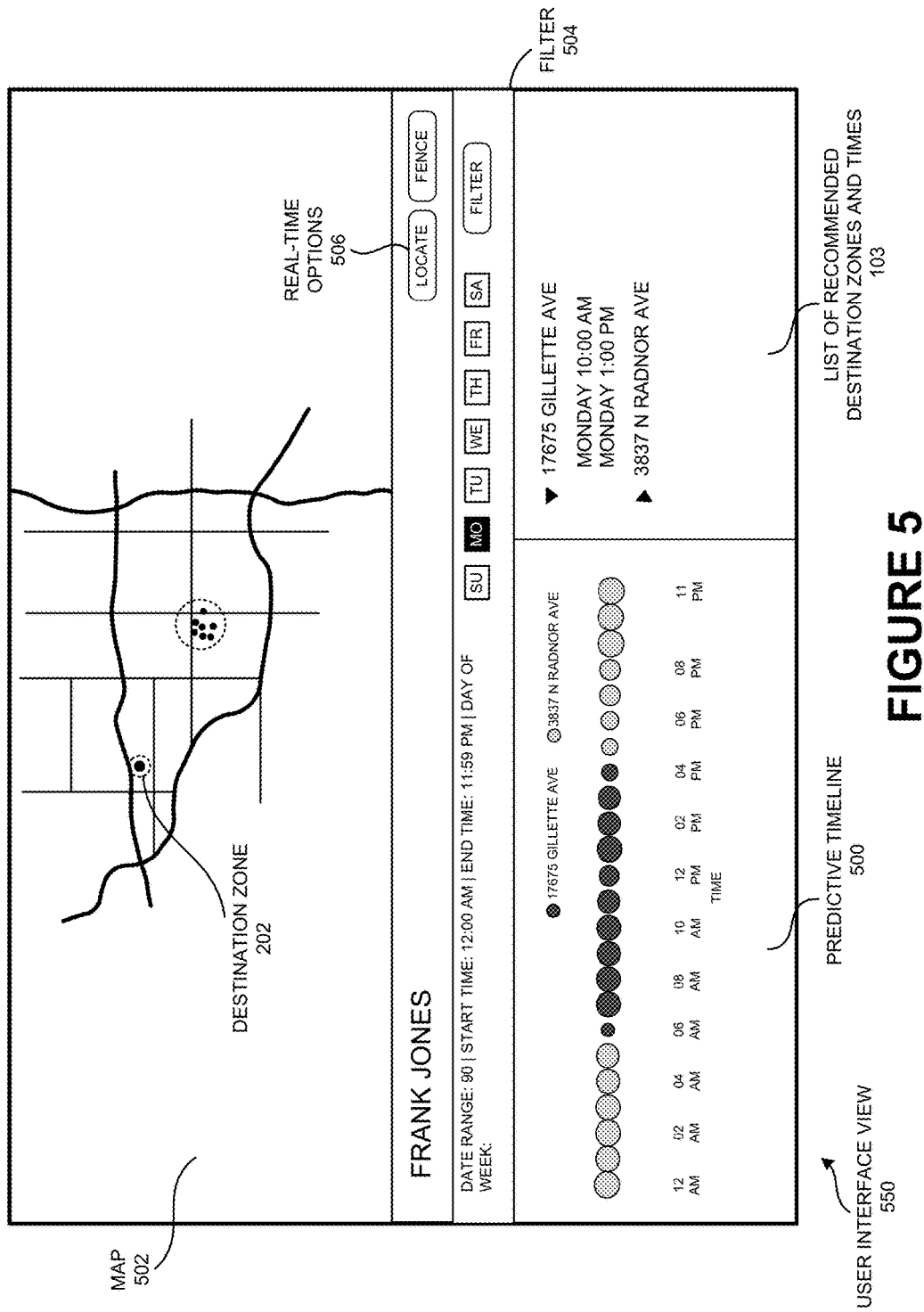
FIG. 5 is a user interface view illustrating the presentation of the list of recommended destination zones and times of FIG. 1, according to one embodiment.

FIG. 5 is a user interface view 550 illustrating the presentation of the list of recommended destination zones and times 103 of FIG. 1, according to one embodiment. Particularly, FIG. 5 illustrates a predictive timeline 500, a map 502, a filter 504, and real-time options 506, in addition to the list of recommended destination zones and times 103 of FIG. 1, and the destination zone 202 of FIG. 2.

A repossessor 104 may utilize user interface view 550 to plan the repossession of the target vehicle 106. The predictive timeline 500 shows the best destination zones 202 for repossession within a defined range of time. For example, FIG. 5 shows a predictive timeline 500 for Mondays, between 12:00 AM and 11:59 PM. As an option, the predictive timeline 500 may utilize graphics which indicate the confidence level of finding the target vehicle 106 at that location/time/day (e.g. the size of the data point, etc.). See, for example, the predictive timeline 500 of FIG. 6.

User interface view 550 includes the list of recommended destination zones and times 103 of FIG. 1. As shown, the list may be organized by destination zones 202, with each entry showing recommended times for repossession, in accordance with one embodiment. As an option, the list may include a 'Details' button, which may provide the repossessor 104 with additional information. Examples of this additional information include, but are not limited to, satellite photos of the location, links to third party images of the location (e.g. Google Street View, etc.), and details as to why this location is being recommended (e.g. visit frequency, recognized association with the borrower such as 'place of employment' or 'residence', proximity to tow yard, type of parking, etc.).

The map 502 may display the destination zones 202 described by the predictive timeline 500 and/or the list of recommended destination zones and times 103, in accordance with one embodiment. As an option, if the repossessor 104 places a cursor over an entry in the list 103 or the timeline 500, the associated destination zone 202 may be highlighted in the map 502. In another embodiment, the map 502 may display the current location of the target vehicle 106, as well as other up-to-date information such as traffic, or the location of agents of the repossessor (e.g. tow trucks, etc.). In one embodiment, the map 502 may be overlaid with a heat map displaying probabilities of successfully repossessing the target vehicle 106 for a specified range of days and/or times. As an option, the repossessor 104 may be able to view the heat map change as they scroll through the temporal range they have specified, allowing them to quickly identify an ideal repossession scenario.

User interface view 550 may also allow the repossessor 104 one or more real-time options 506, in accordance with various embodiments. For example, in one embodiment, the current location of the target vehicle 106 may be displayed on the map 502, as determined by a tracking device 110. The repossessor 104 may have the option of defining a geographic boundary (e.g. a geo-fence, etc.) which, when crossed by the target vehicle 106, notifies the repossessor 104 (e.g. within user interface 550, a text message, email, etc.). As an option, the repossessor 104 may be notified if there are signs that the tracking device 110 has been tampered with or disabled (e.g. loss of signal, continued reports from the device which drastically deviate from previous observations, activation of tampering sensors within the device, etc.).

Finally, user interface view 550 may also include a filter 504, in accordance with one embodiment. The filter 504 may allow the repossessor 104 to define the criteria required for a successful repossession. The filter 504 is discussed further in conjunction with FIG. 7.

In some embodiments, the repossessor 104 may also utilize user interface view 550 to dispatch their agents to repossess a particular target vehicle 106. As a specific example, a repossessor 104 may select an entry in the list 103 or a data point 600 in the timeline 500, and be presented with the option to assign the repossession of the target vehicle 106 within those parameters to a particular agent. As an option, the repossessor 104 may be given a recommended agent to give the assignment to, a recommendation which may be based upon the location of the agent, where the agent is based, the type of equipment needed for the repossession, and/or any other characteristic associated with the agent of the repossessor.

Figure 6:
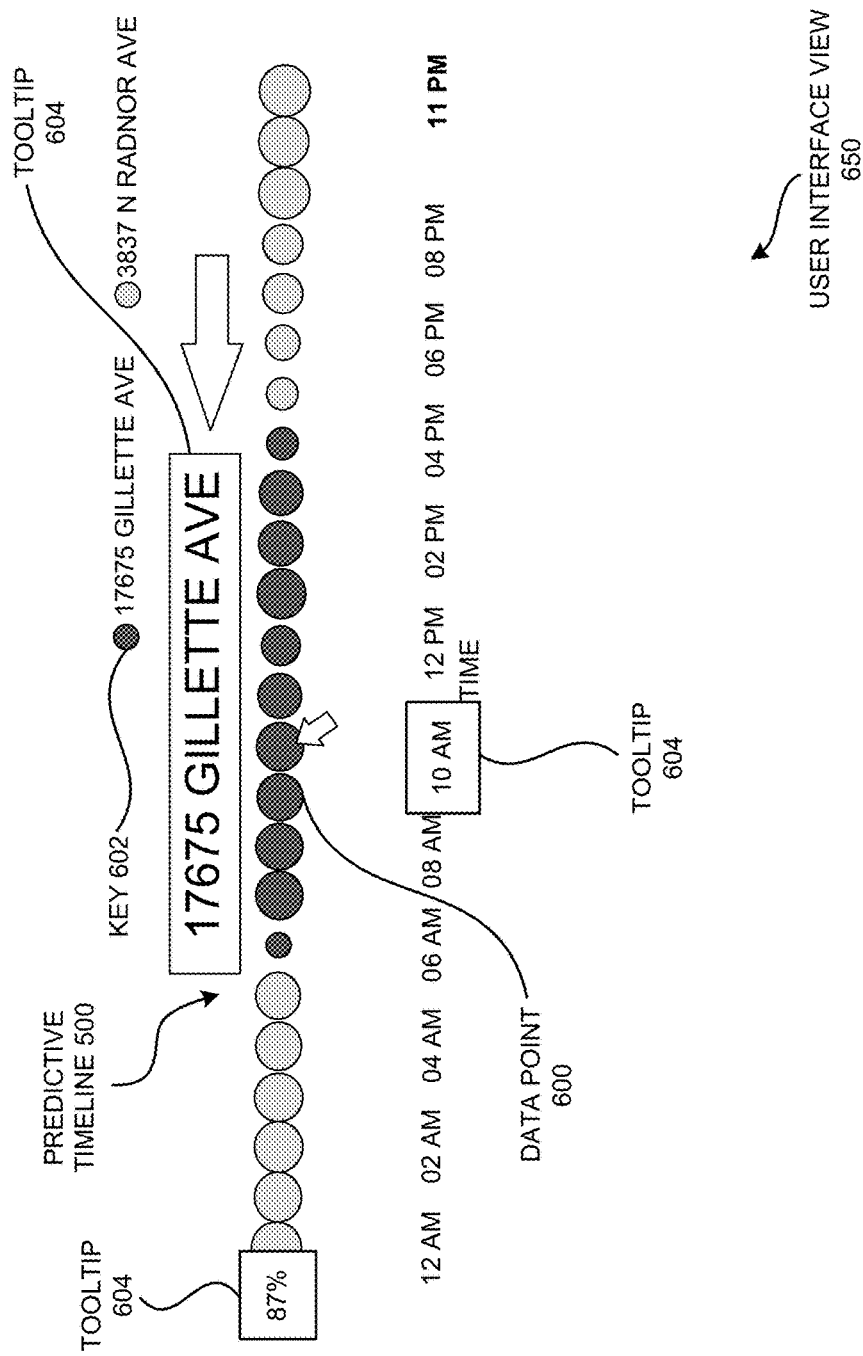
FIG. 6 is a user interface view of the predictive timeline of FIG. 5, according to one embodiment.

FIG. 6 is a user interface view 650 of the predictive timeline 500 of FIG. 5, according to one embodiment. Particularly, FIG. 6 illustrates a data point 600, a key 602, and a tooltip 604, in conjunction with the predictive timeline 500 of FIG. 5.

In the context of the present description, a data point 600 may be a visual representation of a potential repossession event, and at least some of the data associated with it (e.g. destination zone, time, confidence of repossession, "strength" of recommendation, probability of finding the target vehicle 106, equipment needed for repossession, etc.). The data points 600 shown in FIG. 6 are circles of different shading and size, representing destination zones 202 and likelihood of a successful repossession. In other embodiments, the data points 600 may be represented in other ways, such as segments of a clock or days on a calendar.

In some circumstances, the repossessor 104 may wish to repossess the target vehicle 106 at a particular time, or within a particular time range, and needs to see where the best place would be for that to happen. The predictive timeline 500 displays where the recommended destination zone 202 is for repossession at a given time and day using the data points.

In various embodiments, a repossessor 104 may interact with or click on a data point 600 to see potential actions which may be taken (e.g. assign an agent of the repossessor to retrieve the target vehicle 106 at the place and time associated with that point, establish a geo-fence which will alert the repossessor 104 when the vehicle arrives at the place associated with the data point 600 on the day associated with the data point, display additional information about that data point 600 such as why it is being recommended, etc.).

In one embodiment, the key 602 may inform the repossessor 104 of what information (e.g. destination zone, equipment needed, parking type, etc.) is being represented by a characteristic (e.g. style, color, shape, etc.) of the data points 600. In another embodiment, if the repossessor 104 hovers a cursor over a data point, one or more tooltips 604 may display the specific details associated with that data point. For example, in FIG. 6, the data point 600 beneath the cursor represents a 87% likelihood of successful repossession of the target vehicle 106 at 17675 Gillette Ave at 10 AM.

Figure 7:
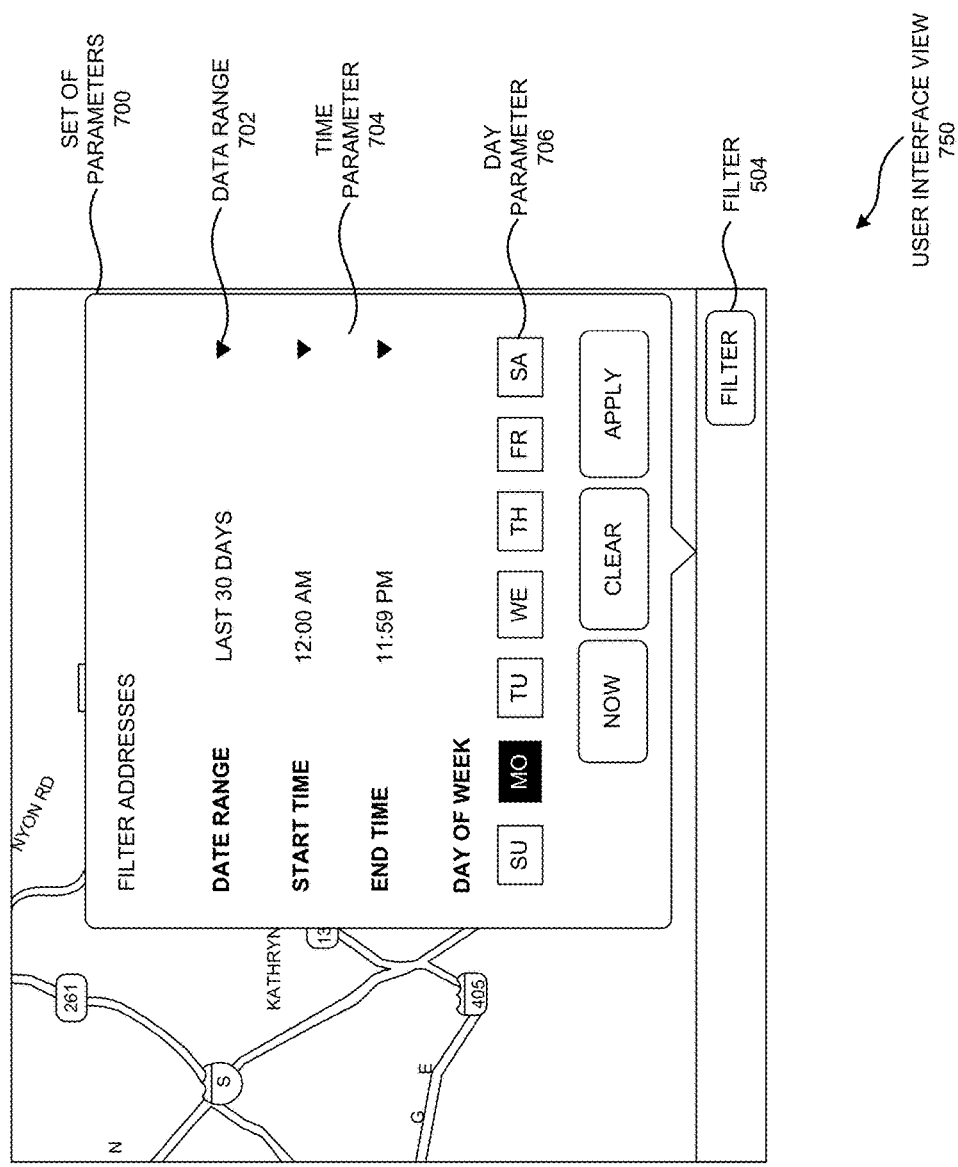
FIG. 7 is a user interface view of the filter of FIG. 5, according to one embodiment.

FIG. 7 is a user interface view 750 of the filter 504 of FIG. 5, according to one embodiment. Particularly, FIG. 7 illustrates a set of parameters 700, a data range 702, a time parameter 704, and a day parameter 706, in the context of the filter 504 of FIG. 5.

In some embodiments, the repossessor 104 may use a filter 504 to limit the recommendations provided to those consistent with certain parameters, such as the set of parameters 700 defined within user interface view 750. In one embodiment, the repossessor 104 may specify a data range 702 of data which will be considered by the predictive recommendation server 100 when applying the predictive model. In another embodiment, the repossessor 104 may specify a time parameter 704, limiting the recommendation to a particular window of time (e.g. preferred business hours for a tow service, etc.). In still another embodiment, the repossessor 104 may specify a day parameter 706, limiting the recommendations provided to those on certain days of the week.

In other embodiments, the repossessor 104 may use a filter 504 to further define conditions necessary or desired for a repossession attempt. For example, the recommendations may be limited to locations where the target vehicle 106 may be towed using a particular type of tow truck. Other conditions which may be specified include, but are not limited to, considerations of fee rates of different towing services (e.g. the charge per mile combined with the location of the tow truck, etc.), and/or disqualification of certain types of locations.

As an option, the repossessor 104 may define the range of time to be considered when assembling the predictive timeline 500 and list of recommended destination zones and times 103. For example, if the lender has indicated that the vehicle must be repossessed within the next two weeks, the repossessor 104 may request the generation of a predictive timeline 500 restricted to the next two weeks.

Figure 8:
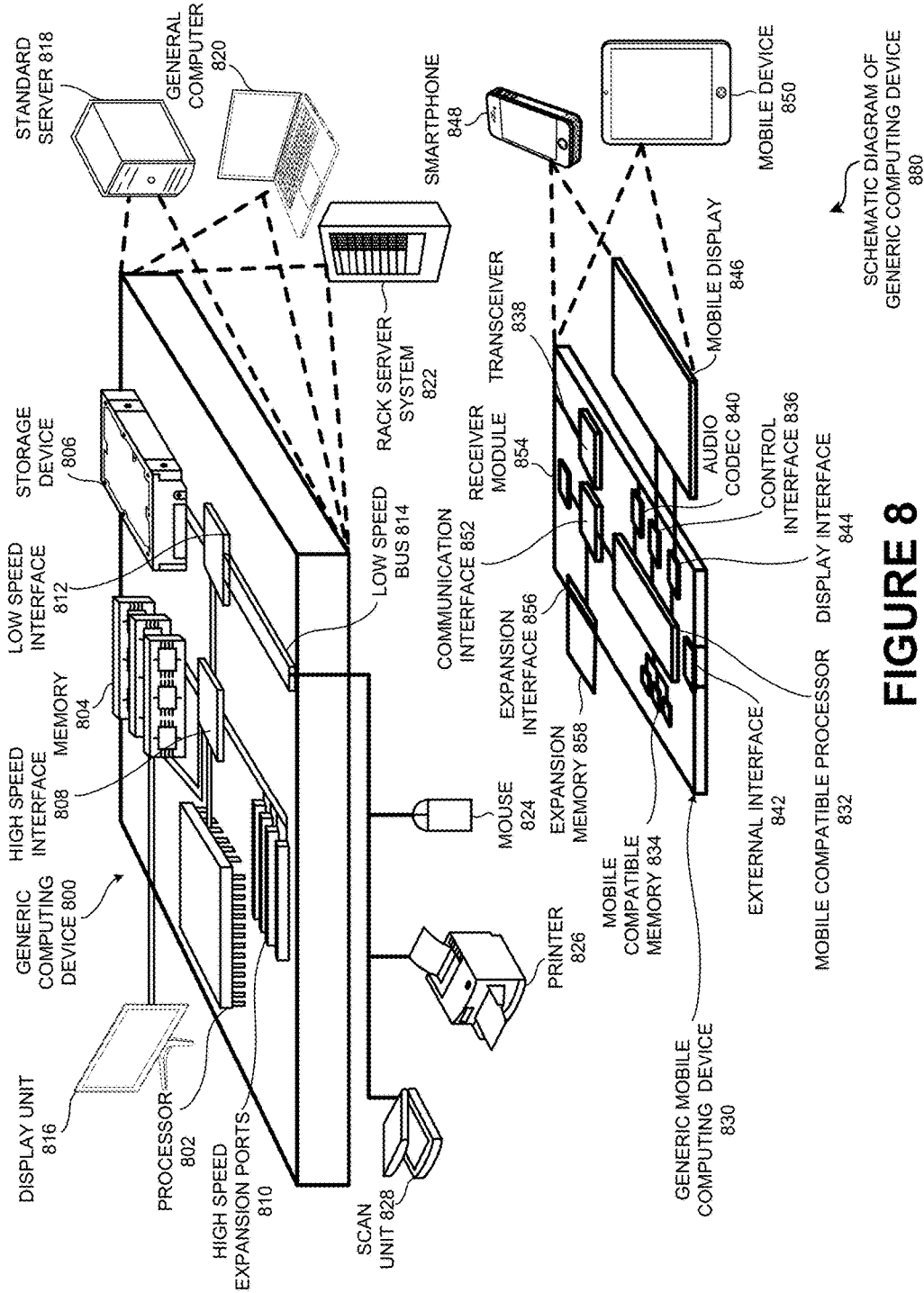
FIG. 8 is a schematic diagram of exemplary data processing devices that can be used to implement the methods and systems disclosed herein, according to one embodiment.

FIG. 8 is a schematic diagram of generic computing device 880 that can be used to implement the methods and systems disclosed herein, according to one or more embodiments. FIG. 8 is a schematic diagram of generic computing device 880 and a mobile device 850 that can be used to perform and/or implement any of the embodiments disclosed herein. In one or more embodiments, the predictive recommendation server 100, the commercial data server 124, the government data server 126, the social media server 128, the lender server 130, and/or the law enforcement server 132 of FIG. 1 may be the generic computing device 800.

The generic computing device 800 may represent various forms of digital computers, such as laptops, desktops, workstations, personal digital assistants, servers, blade servers, mainframes, and/or other appropriate computers. The mobile device 850 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The generic computing device 800 may include a processor 802, a memory 804, a storage device 806, a high speed interface 808 coupled to the memory 804 and a plurality of high speed expansion ports 810, and a low speed interface 812 coupled to a low speed bus 814 and a storage device 806. In one embodiment, each of the components heretofore may be inter-coupled using various buses, and may be mounted on a common motherboard and/or in other manners as appropriate. The processor 802 may process instructions for execution in the generic computing device 800, including instructions stored in the memory 804 and/or on the storage device 806 to display a graphical information for a GUI on an external input/output device, such as a display unit 816 coupled to the high speed interface 808.

In other embodiments, multiple processors and/or multiple buses may be used, as appropriate, along with multiple memories and/or types of memory. Also, a plurality of computing device 800 may be coupled with, with each device providing portions of the necessary operations (e.g., as a server bank, a group of blade servers, and/or a multi-processor system).

The memory 804 may be coupled to the generic computing device 800. In one embodiment, the memory 804 may be a volatile memory. In another embodiment, the memory 804 may be a non-volatile memory. The memory 804 may also be another form of computer-readable medium, such as a magnetic and/or an optical disk. The storage device 806 may be capable of providing mass storage for the generic computing device 800. In one embodiment, the storage device 806 may be includes a floppy disk device, a hard disk device, an optical disk device, a tape device, a flash memory and/or other similar solid state memory device. In another embodiment, the storage device 806 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 804, the storage device 806, a memory coupled to the processor 802, and/or a propagated signal.

The high speed interface 808 may manage bandwidth-intensive operations for the generic computing device 800, while the low speed interface 812 may manage lower bandwidth-intensive operations. Such allocation of functions is exemplary only. In one embodiment, the high speed interface 808 may be coupled to the memory 804, the display unit 816 (e.g., through a graphics processor and/or an accelerator), and to the plurality of high speed expansion ports 810, which may accept various expansion cards.

In the embodiment, the low speed interface 812 may be coupled to the storage device 806 and the low speed bus 814. The low speed bus 814 may be comprised of a wired and/or wireless communication port (e.g., a Universal Serial Bus ("USB"), a Bluetooth® port, an Ethernet port, and/or a wireless Ethernet port). The low speed bus 814 may also be coupled to the scan unit 828, a printer 826, a keyboard, a mouse 824, and a networking device (e.g., a switch and/or a router) through a network adapter.

The generic computing device 800 may be implemented in a number of different forms, as shown in the Figure. In one embodiment, the computing device 800 may be implemented as a standard server 818 and/or a group of such servers. In another embodiment, the generic computing device 800 may be implemented as part of a rack server system 822. In yet another embodiment, the generic computing device 800 may be implemented as a general computer 820 such as a laptop or desktop computer. Alternatively, a component from the generic computing device 800 may be combined with another component in a mobile device 850. In one or more embodiments, an entire system may be made up of a plurality of generic computing device 800 and/or a plurality of generic computing device 800 coupled to a plurality of mobile device 850.

In one embodiment, the mobile device 850 may include a mobile compatible processor 832, a mobile compatible memory 834, and an input/output device such as a mobile display 846, a communication interface 852, and a transceiver 838, among other components. The mobile device 850 may also be provided with a storage device, such as a microdrive or other device, to provide additional storage. In one embodiment, the components indicated heretofore are inter-coupled using various buses, and several of the components may be mounted on a common motherboard.

The mobile compatible processor 832 may execute instructions in the mobile device 850, including instructions stored in the mobile compatible memory 834. The mobile compatible processor 832 may be implemented as a chipset of chips that include separate and multiple analog and digital processors. The mobile compatible processor 832 may provide, for example, for coordination of the other components of the mobile device 850, such as control of user interfaces, applications run by the mobile device 850, and wireless communication by the mobile device 850.

The mobile compatible processor 832 may communicate with a user through the control interface 836 and the display interface 844 coupled to a mobile display 846. In one embodiment, the mobile display 846 may be a Thin-Film-Transistor Liquid Crystal Display ("TFT LCD"), an Organic Light Emitting Diode ("OLED") display, and another appropriate display technology. The display interface 844 may comprise appropriate circuitry for driving the mobile display 846 to present graphical and other information to a user. The control interface 836 may receive commands from a user and convert them for submission to the mobile compatible processor 832.

In addition, an external interface 842 may be provide in communication with the mobile compatible processor 832, so as to enable near area communication of the mobile device 850 with other devices. External interface 842 may provide, for example, for wired communication in some embodiments, or for wireless communication in other embodiments, and multiple interfaces may also be used.

The mobile compatible memory 834 may be coupled to the mobile device 850. The mobile compatible memory 834 may be implemented as a volatile memory and a non-volatile memory. The expansion memory 858 may also be coupled to the mobile device 850 through the expansion interface 856, which may comprise, for example, a Single In Line Memory Module ("SIMM") card interface. The expansion memory 858 may provide extra storage space for the mobile device 850, or may also store an application or other information for the mobile device 850.

Specifically, the expansion memory 858 may comprise instructions to carry out the processes described above. The expansion memory 858 may also comprise secure information. For example, the expansion memory 858 may be provided as a security module for the mobile device 850, and may be programmed with instructions that permit secure use of the mobile device 850. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 834, the expansion memory 858, a memory coupled to the mobile compatible processor 832, and a propagated signal that may be received, for example, over the transceiver 838 and/or the external interface 842.

The mobile device 850 may communicate wirelessly through the communication interface 852, which may be comprised of a digital signal processing circuitry. The communication interface 852 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 838 (e.g., radio-frequency transceiver). In addition, short-range communication may occur, such as using a Bluetooth®, Wi-Fi, and/or other such transceiver. In addition, a GPS ("Global Positioning System") receiver module 854 may provide additional navigation-related and location-related wireless data to the mobile device 850, which may be used as appropriate by a software application running on the mobile device 850.

The mobile device 850 may also communicate audibly using an audio codec 840, which may receive spoken information from a user and convert it to usable digital information. The audio codec 840 may likewise generate audible sound for a user, such as through a speaker (e.g., in a handset of the mobile device 850). Such a sound may comprise a sound from a voice telephone call, a recorded sound (e.g., a voice message, a music files, etc.) and may also include a sound generated by an application operating on the mobile device 850.

The mobile device 850 may be implemented in a number of different forms, as shown in the Figure. In one embodiment, the mobile device 850 may be implemented as a smartphone 848. In another embodiment, the mobile device 850 may be implemented as a personal digital assistant ("PDA"). In yet another embodiment, the mobile device, 850 may be implemented as a tablet device.

Figure 9:
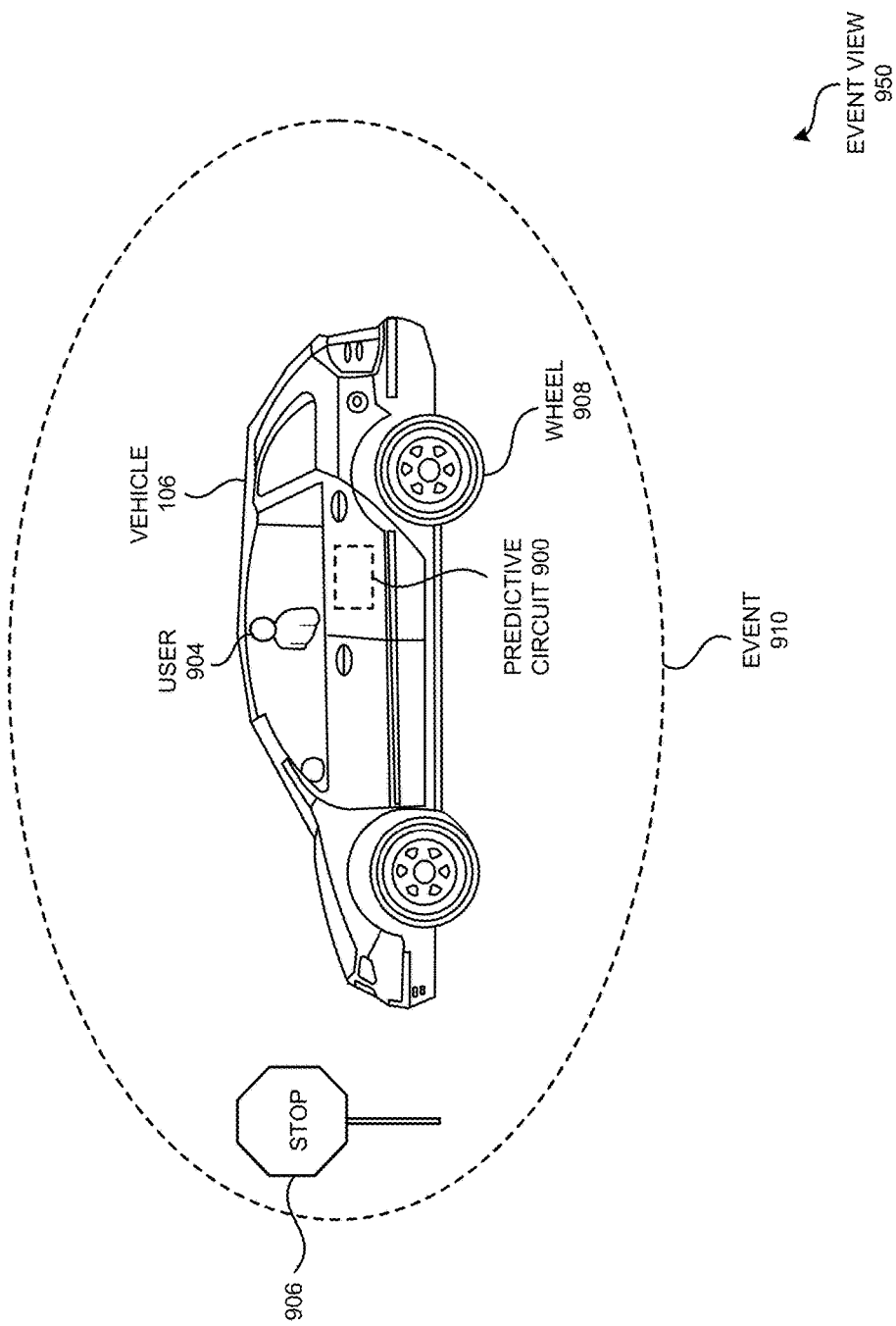
FIG. 9 is an event view that illustrates the vehicle at a sample event in which the vehicle is at a stop sign.

FIG. 9 is an event view 950 that illustrates the vehicle 106 at a sample event 910 in which the vehicle 106 is at a stop sign 906. While the sample event of the stop sign 906 is illustrated in FIG. 1, the event 910 may be a variety of other pause events, such as an arrive at home event, an arrive at work event—based on a time of day, day of week, and/or other characteristics. In FIG. 9, the vehicle 106 is illustrated as having a user 904, a predictive circuit 900, and a wheel 908.

Figure 10:
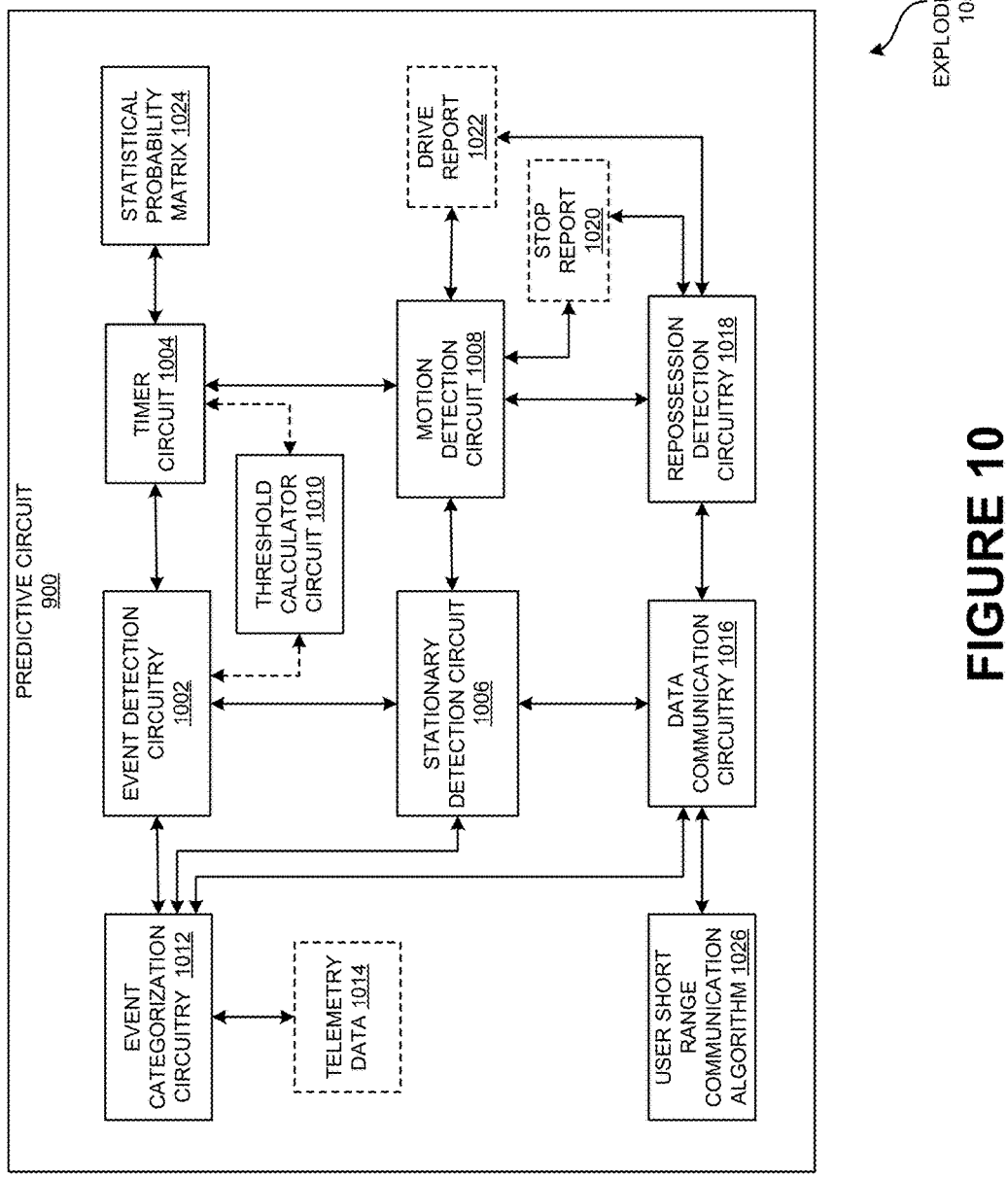
FIG. 10 is an exploded view of the predictive circuit of FIG. 9.

FIG. 10 is an exploded view 1050 of the predictive circuit 900 of FIG. 9. In FIG. 10, various circuits that enable various embodiments described herein are implemented through a combination of hardware and/or software circuitry. In one embodiment, a predictive circuit 900 of a vehicle 106 includes an event detection circuitry 1002 to initiate a timer circuit 1004 of the vehicle 106 when a wheel 908 of the vehicle 106 is in a stationary state (using the stationary detection circuit 1006) beyond a threshold amount of time (using the threshold calculator circuit 1010) during an event 910; an event categorization circuitry 1012 to monitor a telemetry data 1014 of the vehicle 106 to assign a category to the event 910; a data communication circuitry 1016 to communicate the event 910, the category, and a set of other events and categories to a predictive recommendation server 100 on a periodic basis; and a repossession detection circuitry 1018 to determine that the vehicle 106 is pending repossession based on the event 910, the category, the set of other events and categories, and/or a message communicated from the predictive recommendation server 100 to the predictive circuit 900. The predictive circuit 900 may be a hardware and/or software set of instructions on an integrated circuit and/or firmware accessible on the integrated circuit to perform predictive modeling of the vehicle 106 in an absence of global positioning data of the vehicle.

The event 910 may be associated with a time of day, a day of a week, a calendar day, and/or an event 910 type (e.g., by the predictive circuit 900 and/or the predictive recommendation server 100). The event 910 type may be a home location, a work location, a day location, an evening location, a weekend location, a night location, and/or a holiday location. A location of the vehicle 106 may be determined through a triangulation algorithm of the data communication circuitry 1016 of the predictive circuit 900 (e.g., in absence of global position information, and/or a mobile device associated with a user 904 of the vehicle 106. The user 904 of the vehicle 106 may be identified as a primary user 904 of the vehicle 106, and/or a secondary user 904 of the vehicle 106. The triangulation algorithm may be applied to the mobile device when the mobile device is paired with the vehicle 106 through a user short range communication algorithm 1026. The mobile device may be detected using the predictive circuit 900 to have a latitudinal and longitudinal location change with nearby cellular towers in a pattern consistent with a movement of the vehicle 106. The user short range communication algorithm 1026 may be a Bluetooth®, BLE®, Zigbee®, and/or another personal area network (PAN).

The telemetry data 1014 may be determined based on an engine motor status, an accelerator status, a time of pause, a brake status, a park status, an occupant sensor status, a door status, a window status, a hood status, a truck status, a tailgate status, an in-car entertainment system status, an air-conditioning status, an in-car electronic system status, a neutral status and/or an other car status. The predictive circuit 900 and the predictive recommendation server 100 may generate a statistical probability matrix 1024 of a set of predictive potential locations of the vehicle 106 as a function of time based on an analysis of historical data.

The predictive circuit 900 and/or the predictive recommendation server 100 may generate a stop report 1020 and/or a drive report 1022. The drive report 1022 may be generated using the motion detection circuit 1008. The predictive circuit 900 and/or the predictive recommendation server 100 may determine an accuracy of the statistical probability matrix 1024. An artificial intelligence algorithm may be applied when generating the statistical probability matrix 1024. The periodic basis may be 25 hours to enable an hourly cycling of the event 910 and the set of other events from the data communication circuitry 1016 to the predictive recommendation server 100. The event 910 data and the set of other events may be transmitted in real time, an active period, and/or a batch mode from a locally stored cache storing event 910 data since a previous transmittal to the predictive recommendation server 100.

In other embodiment, a method of predictive circuit 900 of a vehicle 106 includes initiating a timer circuit 1004 of the vehicle 106 when a wheel 908 of the vehicle 106 is in a stationary state (using the stationary detection circuit 1006) beyond a threshold amount of time (using the threshold calculator circuit 1010) during an event 910 using a processor and a memory of an event detection circuitry 1002; monitoring a telemetry data 1014 of the vehicle 106 to assign a category to the event 910 using an event categorization circuitry 1012; communicating the event 910, the category, and a set of other events and categories to a predictive recommendation server 100 on a periodic basis using a data communication circuitry 1016; and determining using a repossession detection circuitry 1018 that the vehicle 106 is pending repossession based on the event 910, the category, the set of other events and categories, and/or a message communicated from the predictive recommendation server 100 to the predictive circuit 900.

In yet other embodiment, a predictive circuit 900 of a vehicle 106 includes an event detection circuitry 1002 to initiate a timer circuit 1004 of the vehicle 106 when a wheel 908 of the vehicle 106 is in a stationary state (using the stationary detection circuit 1006) beyond a threshold amount of time (using the threshold calculator circuit 1010) during an event 910; an event categorization circuitry 1012 to monitor a telemetry data 1014 of the vehicle 106 to assign a category to the event 910; a data communication circuitry 1016 to communicate the event 910, the category, and a set of other events and categories to a predictive recommendation server 100 on a periodic basis; and a repossession detection circuitry 1018 to determine that the vehicle 106 is pending repossession based on the event 910, the category, the set of other events and categories, and/or a message communicated from the predictive recommendation server 100 to the predictive circuit 900.

The predictive circuit 900 stops the timer circuit 1004 when the wheel 908 of the vehicle 106 changes to a rotating state when the vehicle 106 is in motion in this yet another aspect. The timer circuit 1004 may calculate a total time to stop. The total time can be associated with the event 910 in this yet another embodiment.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and one output device.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system includes programmable processor, which may be special or general purpose, coupled to receive data and instructions from, and to transmit data and instructions to, a storage system, input device, and output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse 824 by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

An example embodiment will now be described.

Frank Jones enters into a loan agreement with Acme Financing Corp. to purchase a new car. As part of the loan agreement, Frank consents to Acme placing a tracking device 110 within his new car, which will periodically report the location of his car to a server operated by Acme. Mr. Jones made regular payments for a year and a half, but then stopped paying. After being warned by Acme that the car may be repossessed, Mr. Jones removed the tracking device 110 from his car and stopped parking it at his home, hoping to avoid repossession.

In an effort to quickly acquire the car, Acme Financing contracts with a repossessor 104 who has access to a predictive recommendation server 100. The server, using a year and a half of location and non-tracking data 114, determines that Mr. Jones goes surfing at a particular beach whenever the surf size is reported above a certain level. The server uses machine vision algorithms to analyze the parking near the beach, and determines that it would be easy to tow the car quickly. The server monitors the surf forecast, and when it appears the surf report may meet Frank's preference, a notification is sent to the repossessor, who sends a truck to repossess the car.

A number of embodiments have been described. Nevertheless, it will be understood that various modifications may be made without departing from the spirit and scope of the claimed invention. In addition, the logic flows depicted in the Figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the Figures may be shown as distinct and communicating with only a few specific structures and not others. The structures may be merged with each other, may perform overlapping functions, and may communicate with other structures not shown to be connected in the Figures. Accordingly, the specification and/or drawings may be regarded in an illustrative rather than a restrictive sense.

What is claimed is:

1. A repossession recommendation system for providing a recommendation regarding locations and times at which a target vehicle will be parked and available for repossession, the apparatus comprising:
    one or more electronic devices that generate and communicate vehicle location data comprising one or more of:
        a tracking device in the target vehicle that generates location data based on satellite signals when satellite signals are available; and
        a mobile device associated with a user of the target vehicle that generates location data based on satellite signals when satellite signals are available or based on a triangulation algorithm when satellite signals are unavailable;
    a network through which the vehicle location data is communicated; and
    a predictive recommendation server for receiving the vehicle location data via the network, the predictive recommendation server comprising one or more processors that are operable to execute instructions to:
        create a plurality of destination zones associated with the target vehicle based on the vehicle location data, each destination zone having a geographic boundary;
        group a set of visits within each destination zone, wherein each visit comprises an instance during which the target vehicle was parked within the geographic boundary of the destination zone;
        determine a frequency of visits for one or more of the destination zones;
        receive non-tracking data via the network from one or more of a commercial data server, a government data server, a social media server, a lender server, and a law enforcement server, wherein the non-tracking data provides information about the operation of vehicle other than locations and times at which the target vehicle is parked; and
        run a predictive model based at least in part on the frequency of visits and the non-tracking data to generate a list of recommended destination zones and times to repossess the target vehicle.

2. The repossession recommendation system of claim 1 wherein the non-tracking data provides information about types of parking available to the target vehicle in each of the destination zones, wherein the types of parking include one or more of street parking, driveway parking, garage parking, and gated lot parking.

3. The repossession recommendation system of claim 1 wherein the non-tracking data provides one or more of information about results of previous repossession attempts for the target vehicle, and information about a geographic location of a repossessor entity.

4. The repossession recommendation system of claim 1 wherein the predictive recommendation server comprises one or more processors that are operable to execute instructions to display the recommended destination zones on a predictive timeline indicating a probability of the target vehicle being within particular recommended destination zones at particular times of day.

5. A repossession recommendation system for providing a recommendation regarding locations and times at which a target vehicle will be parked and available for repossession, the apparatus comprising:
    a tracking device in the target vehicle that generates vehicle location data; and
    a network through which the vehicle location data is communicated; and
    a predictive recommendation server for receiving the vehicle location data via the network, the predictive recommendation server comprising one or more processors that are operable to execute instructions to:
        create a plurality of destination zones associated with the target vehicle based on the vehicle location data, each destination zone having a geographic boundary;
        group a set of visits within each destination zone, wherein each visit comprises an instance during which the target vehicle was parked within the geographic boundary of the destination zone;

determine a frequency of visits for one or more of the destination zones; and run a predictive model based at least in part on the frequency of visits to generate and display a predictive timeline as a graphical user interface comprising a plurality of graphical data points, each graphical data point corresponding to a particular time of day on a particular day of the week, each graphical data point having an appearance characteristic that indicates a confidence level of finding the target vehicle within a particular destination zone at the particular time of day on the particular day of the week.

6. The repossession recommendation system of claim 5 wherein the one or more processors of the predictive recommendation server receive user input information via the network indicating a particular one of the graphical data points that was selected by a user using the graphical user interface, wherein the one or more processors execute instructions to display to the user one or more actions that may be taken with respect to the graphical data point selected by the user, wherein the one or more actions include one or more of:

provided the user a recommendation of a repossessor entity to which repossession of the target vehicle may be assigned;

assigning a repossessor entity to retrieve the target vehicle at the location, time of day, and day of the week associated with the graphical data point selected by the user;

establishing a geofence around the location associated with the graphical data point clicked on by the user, and alerting a repossessor entity when the target vehicle arrives within the geofence around the location on the day associated with the graphical data point selected by the user; and displaying additional information to the user indicating a probability of successful repossession of the target vehicle within the destination zone at the particular time of day on the particular day of the week indicated by the graphical data point selected by the user.

7. The repossession recommendation system of claim 5 wherein each graphical data point is displayed in a specific color indicating a specific one of the destination zones.

8. The repossession recommendation system of claim 5 wherein the appearance characteristic of each graphical data point that indicates a confidence level of finding the target vehicle within a particular destination zone at the particular time of day on the particular day of the week is a size of the graphical data point, wherein the size of the graphical data point is proportional to the confidence level.

9. The repossession recommendation system of claim 6 wherein the user selects a graphical data point by clicking on or hovering over the graphical data point.

* * * * *